United States Patent
Tagawa et al.

(10) Patent No.: US 12,033,400 B2
(45) Date of Patent: Jul. 9, 2024

(54) OVERHEAD-VIEW IMAGE GENERATION DEVICE, OVERHEAD-VIEW IMAGE GENERATION SYSTEM, AND AUTOMATIC PARKING DEVICE

(71) Applicant: Faurecia Clarion Electronics Co., Ltd., Saitama (JP)

(72) Inventors: Shinya Tagawa, Saitama (JP); Morihiko Sakano, Tokyo (JP); Yoshihiko Araya, Kanagawa (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 424 days.

(21) Appl. No.: 17/371,516

(22) Filed: Jul. 9, 2021

(65) Prior Publication Data
US 2022/0012509 A1 Jan. 13, 2022

(30) Foreign Application Priority Data
Jul. 13, 2020 (JP) ................................. 2020-119895

(51) Int. Cl.
G06K 9/00 (2022.01)
B60W 30/06 (2006.01)
(Continued)

(52) U.S. Cl.
CPC ........... *G06V 20/586* (2022.01); *B60W 30/06* (2013.01); *B62D 15/021* (2013.01);
(Continued)

(58) Field of Classification Search
None
See application file for complete search history.

(56) References Cited

U.S. PATENT DOCUMENTS

2007/0239357 A1  10/2007  Mori et al.
2011/0164037 A1  7/2011   Yoshida et al.
(Continued)

FOREIGN PATENT DOCUMENTS

CN  101082502 A  12/2007
CN  102138163 A  7/2011
(Continued)

OTHER PUBLICATIONS

Extended European Search Report mailed by European Patent Office mailed on Nov. 16, 2021 in corresponding European patent application No. 21184903.9-1009.
(Continued)

*Primary Examiner* — Wei Wen Yang
(74) *Attorney, Agent, or Firm* — IP Business Solutions, LLC

(57) ABSTRACT

An overhead-view image generation device includes: a moving amount calculation unit that calculates a moving distance of a vehicle; a linear overhead-view image generation unit that generates an overhead-view image obtained by conversion of a viewpoint of a captured image of a camera into an overhead viewpoint, and generates a linear overhead-view image obtained by conversion of a shape of the generated overhead-view image into a linear shape; a distance-based turning angle generation unit that calculates, using a turning amount of the vehicle indicated by sensor data of a steering angle sensor and the moving distance calculated by the moving amount calculation unit, distance-based turning angle information indicating a turning angle of the vehicle based on the moving distance; and an overhead-view image reconstruction unit that reconstructs the overhead-view image using the linear overhead-view image and the distance-based turning angle information.

7 Claims, 26 Drawing Sheets

(51) Int. Cl.
  *B62D 15/02* (2006.01)
  *G06V 20/58* (2022.01)
(52) U.S. Cl.
  CPC .............. *B60W 2420/403* (2013.01); *B60W 2554/4048* (2020.02); *B60W 2554/4049* (2020.02)

(56) References Cited

U.S. PATENT DOCUMENTS

| | | | |
|---|---|---|---|
| 2011/0310091 | A2 | 12/2011 | Yoshida et al. |
| 2013/0063601 | A1 | 3/2013 | Wakabayashi et al. |
| 2014/0152774 | A1 | 6/2014 | Wakabayashi et al. |
| 2015/0208041 | A1 | 7/2015 | Wang et al. |
| 2018/0286095 | A1 | 10/2018 | Kusayanagi et al. |
| 2020/0186730 | A1 | 6/2020 | Sakurada et al. |
| 2020/0292320 | A1 | 9/2020 | Sakano et al. |
| 2023/0017805 | A1* | 1/2023 | Kohara .............. B62D 15/0285 |

FOREIGN PATENT DOCUMENTS

| | | |
|---|---|---|
| CN | 102933428 A | 2/2013 |
| CN | 103988499 A | 8/2014 |
| CN | 104641394 A | 5/2015 |
| CN | 108141569 A | 6/2018 |
| DE | 102013224190 A | 5/2015 |
| JP | 2007-269060 A | 10/2007 |
| JP | 2008-132882 A | 6/2008 |
| JP | 2012-18170 A | 1/2012 |
| JP | 2015104982 A * | 6/2015 |
| JP | 2017-147629 A | 8/2017 |
| JP | 2018-112506 A | 7/2018 |
| JP | 2020-095406 A | 6/2020 |

OTHER PUBLICATIONS

Chinese Office Action mailed by Chinese Patent Office dated on Oct. 18, 2023 in corresponding Chinese patent application No. 202110771626.2.

Japanese Office Action mailed by Japanese Patent Office dated on Feb. 20, 2024 in corresponding Japanese patent application No. 2020-119895.

* cited by examiner

FIG.2

| | | NAME | X COORDINATE | Y COORDINATE | LATITUDE AND LONGITUDE |
|---|---|---|---|---|---|
| PARKING LOT 1 | PARKING POSITION (1351) | VERTEX 1 | | | |
| | | VERTEX 2 | | | |
| | | VERTEX 3 | | | |
| | | VERTEX 4 | | | |
| | LANDMARK (1352) | 1 | | | |
| | | 2 | | | |
| | | 3 | | | |
| | | . | | | |
| | | . | | | |
| | TRAVELING ROUTE (1353) | 1 | | | |
| | | 2 | | | |
| | | 3 | | | |
| | | . | | | |
| | | . | | | |

| | | NAME | X COORDINATE | Y COORDINATE | LATITUDE AND LONGITUDE |
|---|---|---|---|---|---|
| PARKING LOT 2 | PARKING POSITION (1351) | VERTEX 1 | | | |
| | | VERTEX 2 | | | |
| | | VERTEX 1 | | | |
| | | VERTEX 2 | | | |
| | LANDMARK (1352) | 1 | | | |
| | | 2 | | | |
| | | 3 | | | |
| | | . | | | |
| | | . | | | |
| | TRAVELING ROUTE (1353) | 1 | | | |
| | | 2 | | | |
| | | 3 | | | |
| | | . | | | |
| | | . | | | |

------- LOCAL SURROUNDING INFORMATION

OVERHEAD-VIEW IMAGE GENERATION DEVICE, OVERHEAD-VIEW IMAGE GENERATION SYSTEM, AND AUTOMATIC PARKING DEVICE

INCORPORATION BY REFERENCE

The present application claims priority under 35 U.S.C. § 119 to Japanese Patent Application No. 2020-119895 filed on Jul. 13, 2020. The content of the application is incorporated herein by reference in its entirety.

BACKGROUND OF THE INVENTION

Field of the Invention

The present invention relates to an overhead-view image generation device, an overhead-view image generation system, and an automatic parking device.

Description of the Related Art

Conventionally, automatic parking has been known as a form of automatic driving. The automatic parking refers to automatic driving limited in a parking lot, and performs a driver's parking operation, monitoring of vehicle surroundings, and prevention of collision with pedestrians and vehicles on behalf of a driver. One example of methods of realizing the automatic parking includes a method of self-generating a map, identifying a position of own vehicle on the self-generated map, and performing automatic parking (for example, see Japanese Patent Laid-Open No. 2012-18170). The map used for such purposes includes landmarks for estimating the position of the own vehicle and map images (overhead-view image) generated by conversion of camera images in an overhead-view. A data quantity of map information is desirably as small as possible.

Japanese Patent Laid-Open No. 2012-18170 discloses a method of associating a dense three-dimensional point cloud acquired by a three-dimensional information acquisition sensor such as LiDAR with color and brightness information acquired by a camera, and converting the three-dimensional point cloud into an overhead view to generate a map image. In order to adopting such a method, a sensor capable of acquiring a point cloud with sufficient density is indispensable. In such a method, since data is held in a state where color and brightness information is correlated with three-dimensional information, the data quantity becomes large.

SUMMARY OF THE INVENTION

An object of the present invention, which has been made in view of the above circumstances, is to generate an overhead-view image with a reduced data quantity.

In order to solve the above problems, a first aspect of the present invention is to provide an overhead-view image generation device including: a data acquisition unit that acquires sensor data of a sensor mounted on a vehicle; a moving amount calculation unit that calculates a moving amount of the vehicle using the sensor data acquired by the data acquisition unit; a linear overhead-view image generation unit that uses a captured image of a surrounding of the vehicle included in the sensor data acquired by the data acquisition unit to generate an overhead-view image, the overhead-view image being obtained by conversion of a viewpoint of the captured image into an overhead viewpoint, and generates a linear overhead-view image, the linear overhead-view image being obtained by conversion of a shape of the generated overhead-view image into a linear shape; a moving amount-based turning amount calculation unit that calculates a turning amount of the vehicle based on a predetermined moving amount of the vehicle, using the sensor data acquired by the data acquisition unit and indicating a turning amount of the vehicle and the moving amount calculated by the moving amount calculation unit; a storage unit that stores the linear overhead-view image generated by the linear overhead-view image generation unit and information indicating the turning amount based on the predetermined moving amount calculated by the moving amount-based turning amount calculation unit; and an overhead-view image reconstruction unit that reconstructs the overhead-view image using the linear overhead-view image and the turning amount based on the predetermined moving amount.

According to the present invention, it is possible to generate an overhead-view image with a reduced data quantity.

BRIEF DESCRIPTION OF THE DRAWINGS

FIG. 2 is a view showing an example of a point cloud map;

DETAILED DESCRIPTION OF THE PREFERRED EMBODIMENT

[1. Configuration of On-Board Device]

An embodiment of the present invention will be described below with reference to the accompanying drawings.

Figure 1:
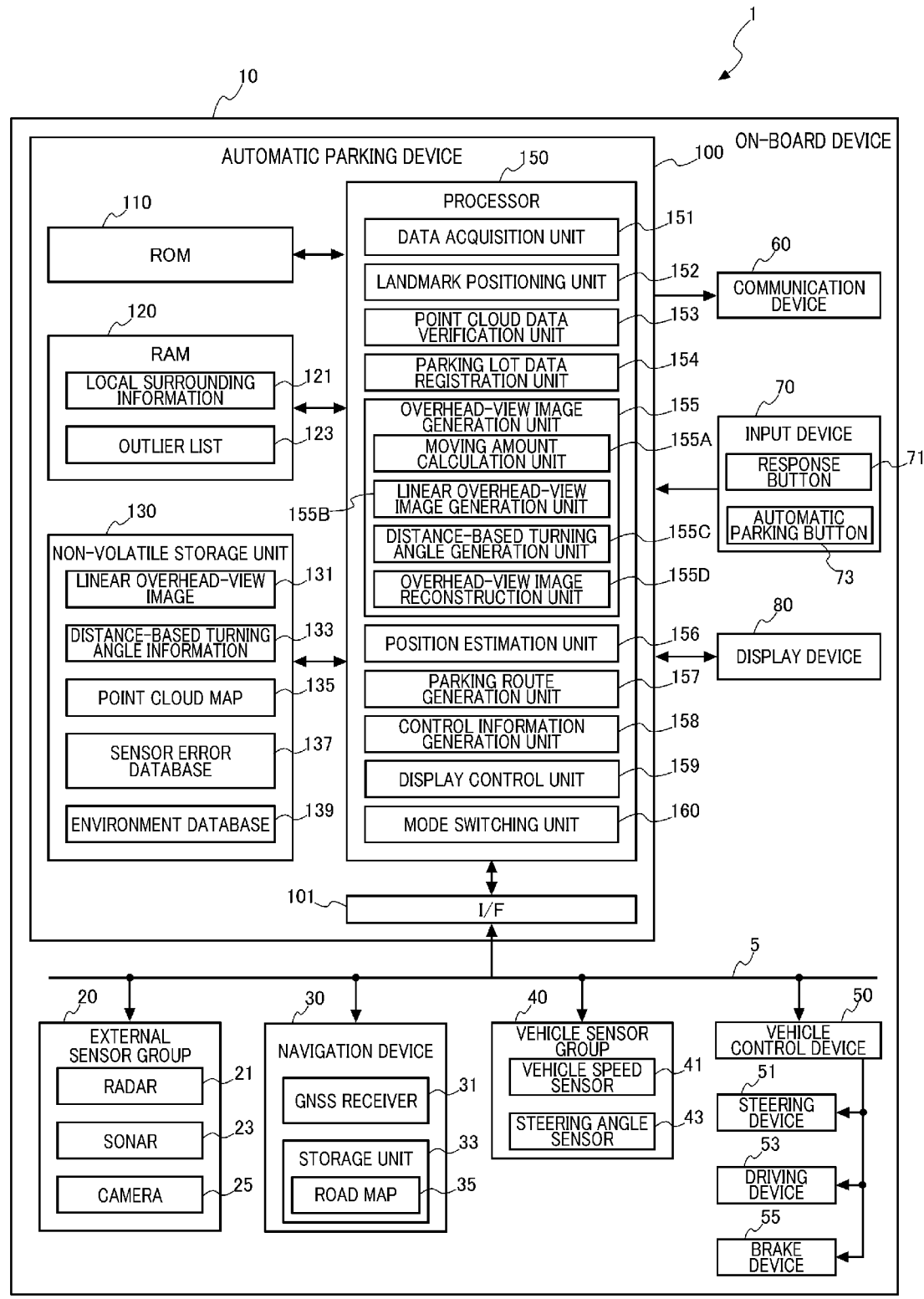
FIG. 1 is a block diagram showing a configuration of an on-board device.

FIG. 1 is a block diagram showing a configuration of an on-board device 10.

The on-board device 10 is a device mounted on a vehicle 1, and includes an external sensor group 20, a navigation device 30, a vehicle sensor group 40, a vehicle control device 50, a steering device 51, a driving device 53, a brake device 55, a communication device 60, an input device 70, a display device 80 (display), and an automatic parking device 100. The automatic parking device 100 is connected to the external sensor group 20, the navigation device 30, the vehicle sensor group 40, and the vehicle control device 50 via a communication bus 5. The communication bus 5 adopts a bus corresponding to a standard such as CAN (Controller Area Network: registered trademark), LIN (Local Interconnect Network), or on-board ethernet (registered trademark).

The external sensor group 20 includes a radar 21, a sonar 23, and a camera 25.

The radar 21 and the sonar 23 radiates radio waves and sound waves having specific wavelengths, respectively, and measure a time until reflected waves of the radiated radio waves and sound waves reflected by an obstacle existing outside a vehicle 1 is received. The radar 21 and the sonar 23 measure, based on the measured time, a position and a direction of the obstacle and a distance to the obstacle. The radar 21 and the sonar 23 measure the obstacle as a point cloud, and output measurement data indicating a measurement result to the automatic parking device 100.

The cameras 25 are installed, for example, on front, rear, right, and left sides of the vehicle 1, respectively. Each of the cameras 25 includes an image sensor such as a CCD (Charge-Coupled Device) or a CMOS (Complementary Metal-Oxide-Semiconductor) and a data processing circuit that generates an image from a light receiving state of the image sensor.

Angles of view of the cameras 25 are adjusted such that the four cameras 25 can capture images in a range of 360° around the vehicle 1. Each of the cameras 25 captures an image at a predetermined frame rate in a preset capturing range and generates a captured image. Each of the cameras 25 outputs the captured image, which is generated by capturing an image, to the automatic parking device 100.

The navigation device 30 includes a processor and a GNSS receiver 31 that receives a GNSS (Global Navigation Satellite Device) signal. The navigation device 30 calculates, using a function of the processor, a latitude and longitude indicating a current position of the vehicle 1 based on a GNSS signal received by the GNSS receiver 31.

The navigation device 30 further includes a storage unit 33. The storage unit 33 is a non-volatile storage device, for example, a memory, and stores a road map 35. The road map 35 includes information on a road connection structure and a latitude and longitude corresponding to a road position.

The navigation device 30 calculates a latitude and longitude of a road position on which the vehicle 1 travels, based on the latitude and longitude obtained by the calculation and the road map 35 including the latitude and longitude. The latitude and longitude calculated by the navigation device 30 may not have to be highly accurate, and may include an error of about several m to 10 m, for example. The navigation device 30 outputs the calculated latitude and longitude, as positioning data, to the automatic parking device 100.

The vehicle sensor group 40 includes a plurality of sensors that are mounted on the vehicle 1 to detect a traveling state of the vehicle 1. In the present embodiment, the vehicle sensor group 40 includes a vehicle speed sensor 41 that detects a vehicle speed of the vehicle 1 and a steering angle sensor 43 that detects a steering angle of a steering wheel of the vehicle 1, but may include other sensors of a brake sensor and a shift position sensor, for example.

The vehicle control device 50 is, for example, a computer including a processor such as an ECU (Electronic Control Unit), and a device that controls the steering device (steering) 51, the driving device (power train) 53, and the brake device (brake) 55 which are mounted on the vehicle 1. The vehicle control device 50 is connected to the steering device 51, the driving device 53, and the brake device 55. The vehicle control device 50 controls, using a function of the processor, the steering device 51, the driving device 53, and the brake device 55 according to control information input from the automatic parking device 100, and causes the vehicle 1 to automatically travel. The vehicle control device 50 corresponds to an automatic parking unit of the present invention.

The communication device 60 (receiver/transceiver) includes an antenna to perform radio communication with an external device, and transmits and receives data to/from the external device. The external device includes, for example, a mobile terminal owned by a user. The communication device 60 communicates data with the mobile terminal and exchanges information when the user is outside the vehicle 1. The communication device 60 may communicate with not only the user's mobile terminal but also any other devise. The communication device 60 corresponds to a communication unit of the present invention.

The input device 70 functions as an acceptance unit that accepts a user's operation. The input device 70 of the present embodiment includes a response button 71 and an automatic parking button 73 as hardware buttons. The response button 71 is a button that accepts the user's operation on display of the display device 70, and includes a button for inputting an affirmative operation and a button for inputting a negative operation. The automatic parking button 73 is a button that causes the automatic parking device 100 to start automatic parking. The input device 70 outputs an operation signal corresponding to the operated button to the automatic parking device 100 when the response button 71 or the automatic parking button 73 is operated. The automatic parking device 100 determines, based on the input operation signal, whether the response button 71 is operated or the automatic parking button 73 is operated.

The display device 70 includes, for example, a display panel such as a liquid crystal display, and causes the display panel to display an image based on display data generated by the automatic parking device 100.

Further, the display device 70 may include a touch panel. The touch panel includes a touch sensor that detects a touch operation on the display panel. The touch panel outputs coordinate information indicating coordinates of the touch panel touched by the touch operation to the automatic parking device 100. In addition, when the response button 71 and the automatic parking button 73 are displayed on the touch panel and coordinate information corresponding to display positions of these buttons are input, the automatic parking device 100 may determine that the corresponding button is operated.

The automatic parking device 100 includes an interface 101, ROM (Read Only Memory) 110, RAM (Random access memory) 120, a non-volatile storage unit 130, and a processor 150. Hereinafter, the interface 101 will be referred to as an I/F 101.

The interface 101 is connected to the external sensor group 20, the navigation device 30, the vehicle sensor group 40, and the vehicle control device 50 via the communication bus 5, and communicates data with these sensors and devices.

The ROM 110 is a read-only memory, and stores a computer program to be executed by the processor 150. The ROM 110 stores internal parameters of a focal length of the camera 25 and a size of an image capturing element and external parameters indicating a mounting position and a mounting posture of the camera 25 on the vehicle 1.

The RAM 120 functions as a main storage device of the automatic parking device 100, and stores a computer program to be executed by the processor 150 or data to be processed when the computer program is executed by the processor 150 and processing result data. Further, the RAM 120 stores a local surrounding information 121 and an outlier list 123.

In the local surrounding information 121, coordinates of points forming a landmark is registered, the landmark being detected by the automatic parking device 100 in a position estimation mode 230, which will be described below. The landmark is an object having characteristics that can be identified by the sensors, for example, the radar 21, the sonar 23, and the camera 25, and includes, for example, a parking frame formed on a road surface and obstacles such as pillars and walls of a parking lot that hinders the traveling of the vehicle 1. The coordinates of the points forming the landmark is a coordinate system based on the position and the orientation of the vehicle 1 when the registration of the local surrounding information 121 is started, and is in a coordinate system in which the position of the vehicle 1 is an origin, a traveling direction of the vehicle 1 is a Y-axis, and a right side in the traveling direction is an X-axis. The coordinate system is hereinafter referred to as a "local coordinate system". The local coordinate system corresponds to a second coordinate system of the present invention.

The outlier list 123 is a list in which information on target points to be excluded is registered among the coordinates of the points registered as the local surrounding information 121. The outlier list 123 is appropriately updated by the automatic parking device 100.

The non-volatile storage unit 130 is formed from a non-volatile memory, for example, a flash memory, and stores a linear overhead-view image 131, distance-based turning angle information 133, a point cloud map 135, a sensor error database 137, and an environment database 139.

The linear overhead-view image 131 is an overhead-view image generated based on the images captured by the cameras 25 installed on the front, rear, left, and right sides of the vehicle 1. Specifically, the linear overhead-view image 131 is an overhead-view image generated by a reflection of information on a moving amount (moving distance) of the vehicle 1 obtained from the sensor data of the vehicle speed sensor 41 without a reflection of information on a turning amount obtained from the steering angle sensor 43 at the time of generation of the overhead-view image.

The distance-based turning angle information 133 includes a table in which the moving distance of the vehicle 1 and the turning amount are registered in correlation with each other, the moving distance being calculated based on the sensor data of the vehicle speed sensor 41, the turning amount being calculated based on the sensor data of the steering angle sensor 43. When the automatic parking device 100 shifts to a map storage mode 220 to be described below so that a recording coordinate system is set and recording of sensor data of the external sensor group 20 is started, the moving distance of the vehicle 1 and the moving distance-based turning amount are registered in correlation with each other in the table. The recording coordinate system is, for example, a coordinate system in which a position of the vehicle 1 at the start time of shifting of the automatic parking device 100 to the map storage mode 220 and recording of the sensor data is an origin (0,0), a traveling direction (posture) of the vehicle 1 at the time of the start of recording is a Y-axis, and a right direction of the vehicle 1 at the start time of recording is an X-axis.

Data (hereinafter, referred to as parking lot data) related to the parking lot is registered in the point cloud map 135. The parking lot data includes coordinate information indicating the parking position in the parking lot, coordinate information indicating the position of the landmark, and coordinate information indicating a traveling route of the vehicle 1 at the time of creation of the map data.

FIG. 2 is a view showing an example of the point cloud map 135. The point cloud map 135 shown in FIG. 2 indicates an example in which two pieces of parking lot data are registered. In the parking lot data, position information of a parking position 1351, a landmark 1352, and a traveling route 1353 is registered. The position information includes information indicating a relative position and information indicating an absolute position. The information indicating the relative position is coordinate information based on a predetermined position, and the information indicating the absolute position is a latitude and longitude.

For example, when the parking position 1351 is a rectangle, the coordinate information of the parking position 1351 is recorded as coordinates of four vertices in the rectangular region. However, the parking position 1351 is not limited to the rectangle, and may be a polygon or an ellipse other than the rectangle.

The coordinate information of the landmark 1352 indicates coordinates on a two-dimensional plane of the point cloud forming the landmark.

The coordinate information indicating the traveling route 1353 indicates a traveling route on which the vehicle 1 travels at the time of recording of coordinates of the parking position 1351 and the landmark 1352.

The coordinate information registered in the point cloud map 135 indicates coordinates in a coordinate system unique to each parking lot data. The coordinate system unique to each parking lot data registered in the point cloud map 135 is referred to as a parking lot coordinate system. The parking lot coordinate system is, for example, a coordinate system in which a position of the vehicle 1 at the start time of recording of measurement data measured by the external sensor group 20 is an origin, a traveling direction of the vehicle 1 at the start time of recording is a Y-axis, and a right direction of the vehicle 1 at the time of the start of the recording is an X-axis. The parking lot coordinate system corresponds to a first coordinate system of the present invention.

Error data is registered in the sensor error database 137, the error data being included when the position of the vehicle 1 is estimated based on the sensor data of the vehicle sensor group 40. More specifically, error data included when the vehicle 1 is traveled at a preset vehicle speed and a turning radius and the position of the vehicle 1 is estimated by known dead reckoning.

In the environment database 139, data indicating an allowable when the position of the vehicle 1 is estimated by the known dead reckoning is registered for each width of the road. The sensor error database 137 and the environment database 139 are used as determination materials for determining whether the point cloud map 135 can be used for position estimation of the vehicle 1 and generation in a subsequent moving route of the vehicle 1.

The processor 150 is a calculation processing device formed from a CPU (Central Processing Unit) and an MPU (Micro Processing Unit). The processor 150 executes a computer program to control each unit of the on-board device 10. The processor 150 may be formed from a single processor, or may be formed from a plurality of processors. Further, the processor 150 may be formed from a SoC (System on Chip) integrated with a part or all of the ROM 110, the RAM 120, and the non-volatile storage unit 130 or with other circuits. In addition, the processor 150 may be formed from a combination of a CPU that executes a program and a DSP (Digital Signal Processor) that executes predetermined calculation processing. Further, all of the functions of the processor 150 may be implemented in hardware, or the processor 150 may be configured using a programmable device.

The processor 150 includes, as functional blocks, a data acquisition unit 151, a landmark positioning unit 152, a point cloud data verification unit 153, a parking lot data registration unit 154, an overhead-view image generation unit 155, a position estimation unit 156, a parking route generation unit 157, a control information generation unit 158, a display control unit 159, and a mode switching unit 160. These blocks represent, by blocks, functions realized by the processor 150 that executing an instruction set of a computer program to calculate and control data.

The data acquisition unit 151 receives the sensor data output by the external sensor group 20 and the vehicle sensor group 40. The data acquisition unit 151 causes the non-volatile storage unit 130 to store the received sensor data.

The landmark positioning unit 152 executes landmark positioning and acquires point cloud data indicating the position of the point cloud forming the landmark. As described above, the landmark has characteristics that can be identified by the sensors, for example, the radar 21, the sonar 23, and the camera 25, and includes the pillars and walls of the parking lot and the white line parking frame painted on the road surface of the parking lot. In the present embodiment, the landmark does not include moving objects, for example, other vehicles and people.

The landmark positioning unit 152 reads, from the non-volatile storage unit 130, the sensor data of the radar 21 or the sonar 23 and the captured image of the camera 25. The landmark positioning unit 152 acquires, based on the read sensor data, point cloud data indicated by the landmark to be detected.

A method of detecting the parking frame as the landmark from the captured image will be described below.

The landmark positioning unit 152 extracts edges included in the input captured image by filter processing using a filter such as a Sobel filter. Next, the landmark positioning unit 152 extracts pairs of rising edges, which are a change from white to black, and falling edges, which are a change from black to white, for example. Then, the landmark positioning unit 152 determines whether a distance between the pairs is within a preset first setting range. The first setting range is set to a range in which the distance between the pairs substantially coincides with a thickness of the white line forming the parking frame. When the distance between the extracted pairs is within the first setting range, the landmark positioning unit 152 sets the detected pair as a candidate for the parking frame.

The landmark positioning unit 152 detects a plurality of candidates for the parking frame by the same processing, and when a distance between the candidates for the parking frame is within a preset second setting range, detects such candidates for the parking frame as a parking frame. The second setting range is set to a range in which the white lines forming the parking frame can be spaced apart from each other.

In addition, the landmark positioning unit 152 detects road surface paint other than the parking frame by the following process. First, the landmark positioning unit 152 extracts edges from the input captured image by the filter processing using the filter such as the Sobel filter. The landmark positioning unit 152 searches for pixels that have edge strength larger than a preset constant value and the distance between edges corresponding to the width of the white line, and extracts edges included in the captured image.

Next, the landmark positioning unit 152 detects a vehicle or a person from the captured image using known template matching, and excludes the moving object such as the detected vehicle or person from the edges extracted by the filter processing. Further, the landmark positioning unit 152 reads internal parameters and external parameters from the ROM 110, and calculates a positional relation between a subject in the captured image and the camera 25 using these read parameters. Next, the landmark positioning unit 152 tracks the subject on the continuously captured image to calculate a relative speed difference between the vehicle 1 and the subject. Then, the landmark positioning unit 152 determines that the subject is a moving object when the vehicle speed of the vehicle 1 obtained by the sensor data of the vehicle speed sensor 41 and the steering angle sensor 43 does not coincide with the speed difference with the subject, and excludes information on such a moving object from the measurement result.

The landmark positioning unit 152 registers the point cloud data indicating the detected parking position 1351, the point cloud data indicating the landmark, and the point cloud data indicating the traveling route in the point cloud map 135.

The point cloud data verification unit 153 verifies whether the point cloud data acquired by the landmark positioning unit 152 is data that can be used as parking lot data, as triggered by the vehicle 1 moving to the parking position and a side brake operated.

The point cloud data verification unit 153 verifies whether the point cloud data acquired by the landmark positioning unit 152 is data that can be used for self-position estimation of the vehicle 1 and generation of a moving route due to subsequent automatic parking. When the point cloud data cannot be used for the self-position estimation, there is a problem that the automatic parking using the point cloud data will fail as a result, and thus the point cloud data is to prevent such a problem.

The point cloud data verification unit 153 verifies the point cloud data based on two verification conditions.

A first verification condition is local establishing possibility of the point cloud data. Further, a second verification condition is a travelable distance only by autonomous navigation.

The point cloud data verification unit 153 determines local establishing possibility of the point cloud data from a density and a shape of a point cloud around certain surroundings at positions spaced apart from each other on a traveling locus, on which the vehicle 1 travels, to acquire the point cloud data. For example, when the density of the point cloud data existing in certain surroundings of the vehicle 1 is equal to or higher than a preset threshold value and the same point cloud distribution pattern does not exist in the certain surroundings of the vehicle 1, the point cloud data verification unit 153 determines that the local establishing possibility of the point cloud data is satisfied.

Next, the second verification condition, that is, the travelable distance only by the autonomous navigation will be described.

The point cloud data verification unit 153 divides the traveling locus, on which the vehicle 1 travels, at predetermined intervals to acquire the point cloud data. The point cloud data verification unit 153 calculates a travelable distance only by the autonomous navigation for each divided section, and causes the RAM 120 to store the calculated distance. The point cloud data verification unit 153 refers to the sensor error database 137 and the environment database 139, and even when there is a section in which the local establishing possibility of the point cloud data is not established, determines that the point cloud data to be verified can be used as parking lot data as long as the amount of error generated in the autonomous navigation of the section is sufficiently small and within an allowable error. Further, the point cloud data verification unit 153 determines that the point cloud map 135 cannot be used when the local establishing possibility is not established and the traveling route includes a section in which the error in the autonomous navigation is larger than the allowable error.

The parking lot data registration unit 154 determines whether to integrate the point cloud data determined by the point cloud data verification unit 153 to be usable as the parking lot data with the parking lot data already registered in the point cloud map 135 or whether to register the point cloud data as new parking lot data.

The parking lot data registration unit 154 calculates a point cloud matching rate between the target point cloud data and the point cloud data included in the parking lot data already registered in the point cloud map 135, and determines whether to integrate the target point cloud data with the parking lot data already registered or whether to register the target point cloud data as new parking lot data. The parking lot data registration unit 154 integrates the point cloud data with the parking lot data or registers it as new parking lot data according to the determination result.

[2. Configuration of Overhead-View Image Generation Unit and Linear Overhead-View Image]

Figure 3:
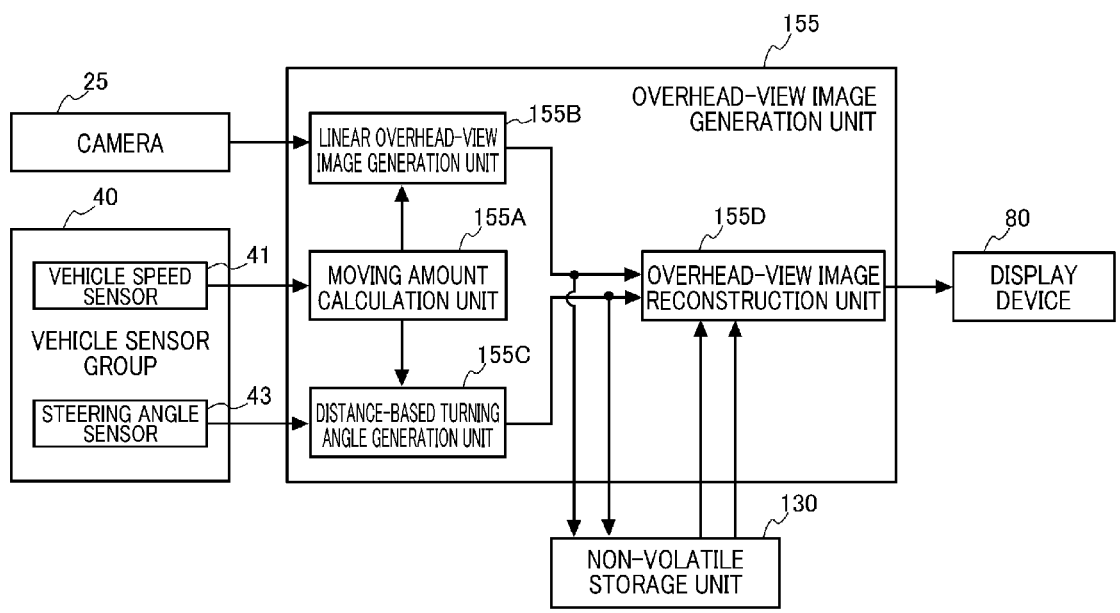
FIG. 3 is a block diagram showing a configuration of an overhead-view image generation unit.

FIG. 3 is a block diagram showing a configuration of the overhead-view image generation unit 155. The overhead-view image generation unit 155 corresponds to an overhead-view image generation device of the present invention.

The overhead-view image generation unit 155 includes a moving amount calculation unit 155A, a linear overhead-view image generation unit 155B, a distance-based turning angle generation unit 155C, and an overhead-view image reconstruction unit 155D.

The sensor data of the vehicle speed sensor 41 is input to the moving amount calculation unit 155A. The moving amount calculation unit 155A calculates, based on the input sensor data, a moving distance that the vehicle 1 has moved.

The moving amount calculation unit 155A calculates, based on the sensor data of the vehicle speed sensor 41 to be input, the moving distance of the vehicle 1 when the operation mode of the automatic parking device 100 shifts to the map storage mode 220, the recording coordinate system is set, and the recording of the sensor data of the external sensor group 20 is started.

The linear overhead-view image generation unit 155B generates a linear overhead-view image 131 using the captured image of the camera 25 and the moving distance of the vehicle 1 calculated by the moving amount calculation unit 155A.

Generally, the overhead-view image is generated in such a manner that the captured image of the camera 25 is subjected to viewpoint conversion by software using the external parameters read from the ROM 110 and thus is converted into images of the overhead view, which is a viewpoint looking down the ground from the top of the vehicle 1, and the converted images are joined together in a time-series way along the traveling locus of the vehicle 1. At this time, the linear overhead-view image generation unit 155B generates the linear overhead-view image 131 by considering only the moving distance of the vehicle 1 calculated by the moving amount calculation unit 155A without considering the information on the turning amount indicated by the sensor data of the steering angle sensor 43. In other words, the linear overhead-view image 131 is an image obtained by linearly extending the overhead-view image 200.

Figure 4:
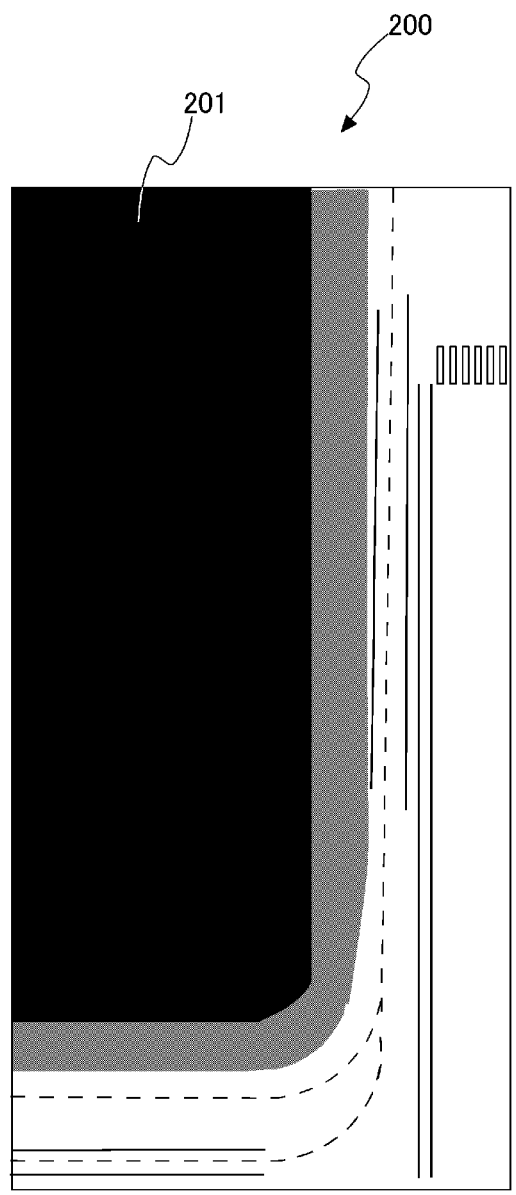
FIG. 4 is a view showing an example of an overhead-view image.
Figure 5:
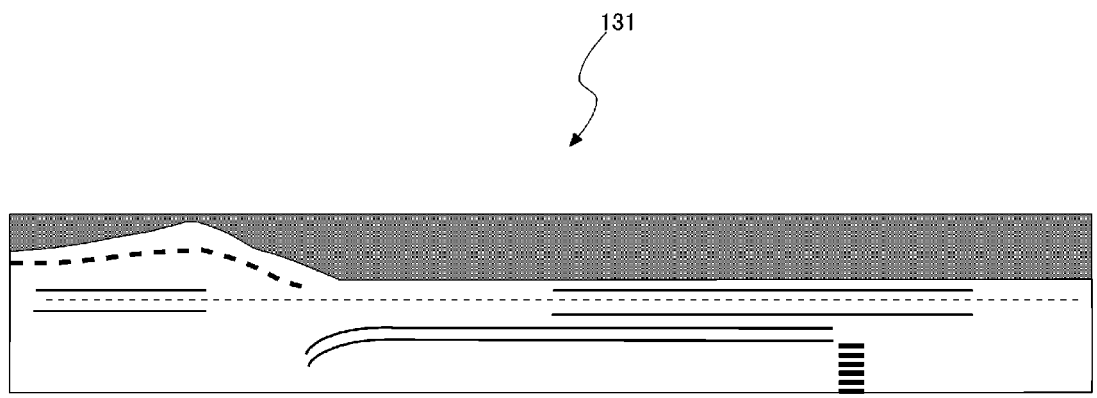
FIG. 5 is a view showing an example of a linear overhead-view image.

FIG. 4 is a view showing an example of an overhead-view image, and FIG. 5 is a view showing an example of the linear overhead-view image 131. Since the linear overhead-view image 131 shown in FIG. 5 is a map image generated without considering the information on the turning amount, it is possible to reduce data of a useless region 201 generated by turning shown in FIG. 4.

In comparison between the overhead-view image 200 and the linear overhead-view image 131, the overhead-view image 200 may have a case in which a data quantity extremely increases when the vehicle 1 turns, but the linear overhead-view image 131 has a characteristic that a data quantity increases proportionally depending on the moving distance of the vehicle 1.

The distance-based turning angle generation unit 155C corresponds to a moving amount-based turning amount calculation unit of the present invention. The moving distance of the vehicle 1 calculated by the moving amount calculation unit 155A and the sensor data of the steering angle sensor 43 are input to the distance-based turning angle generation unit 155C. The distance-based turning angle generation unit 155C generates distance-based turning angle information 133 when the moving distance to be input and the turning amount indicated by the sensor data are registered in a table in correlation with each other. When the automatic parking device 100 shifts to the map storage mode 220, the recording coordinate system is set, and the recording of the sensor data of the external sensor group 20 is started, the distance-based turning angle generation unit 155C registers the moving distance of the vehicle 1 in the recording coordinate system and the turning amount for each moving distance in the table so as to be correlated with each other, and generates the distance-based turning angle information 133.

The linear overhead-view image 131 generated by the linear overhead-view image generation unit 155B and the distance-based turning angle information 133 generated by the distance-based turning angle generation unit 155C are stored in the non-volatile storage unit 130. Since the linear overhead-view image 131 instead of the overhead-view image 200 is stored in the non-volatile storage unit 130, a hierarchical structure of the three-dimensional parking lot can also be expressed by a two-dimensional image, and the overhead-view image 200 can be generated using the linear overhead-view image 131 even in the three-dimensional parking lot.

Further, if the sensor data of the vehicle speed sensor 41 and the steering angle sensor 43 contain an error, when the vehicle 1 goes around once and returns to the same place, the overhead-view image 200 to be naturally placed on the same location may overlap over another location due to the error.

Even when the sensor data of the vehicle speed sensor 41 and the steering angle sensor 43 contain the error, the linear overhead-view image 131 and the overhead-view image 200 generated based on the distance-based turning angle information 133 do not overlap erroneously, and staining of the overhead-view image 200 can be reduced.

In addition, there is an advantage that the shape of the overhead-view image can be easily corrected using correction information of the own vehicle behavior.

Figure 6:
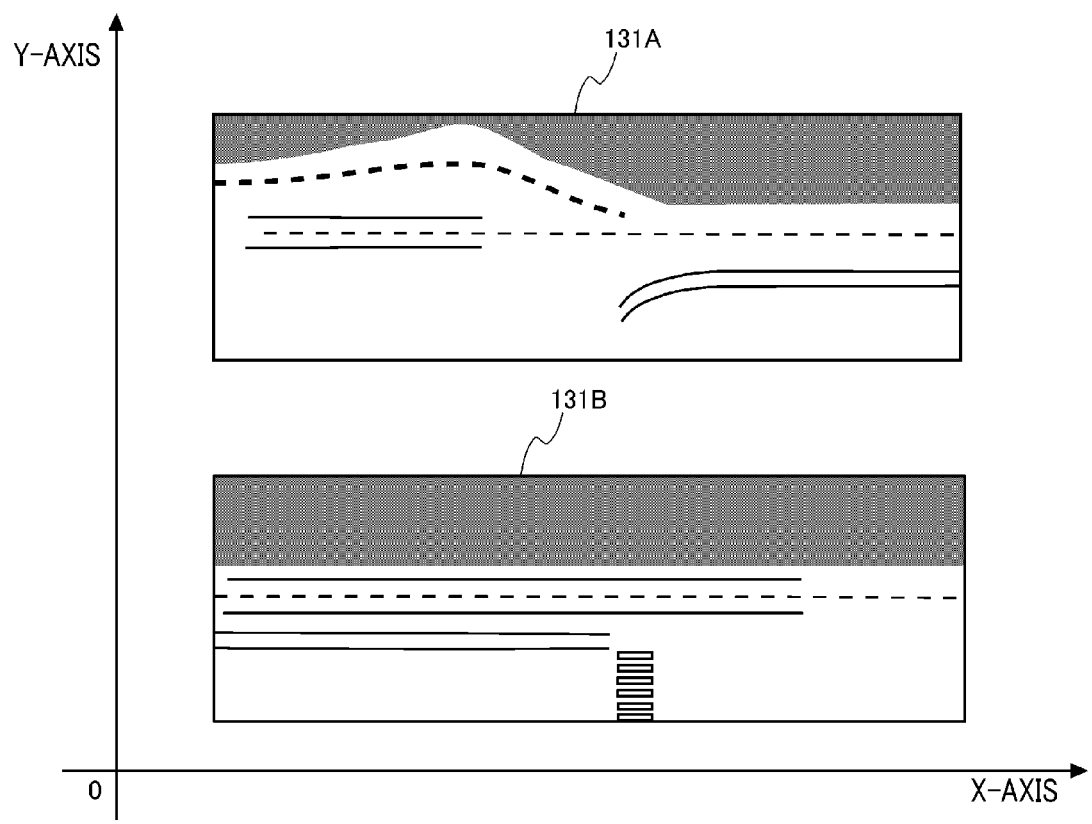
FIG. 6 is a view showing divided linear overhead-view images stored in a non-volatile storage unit.
Figure 7:
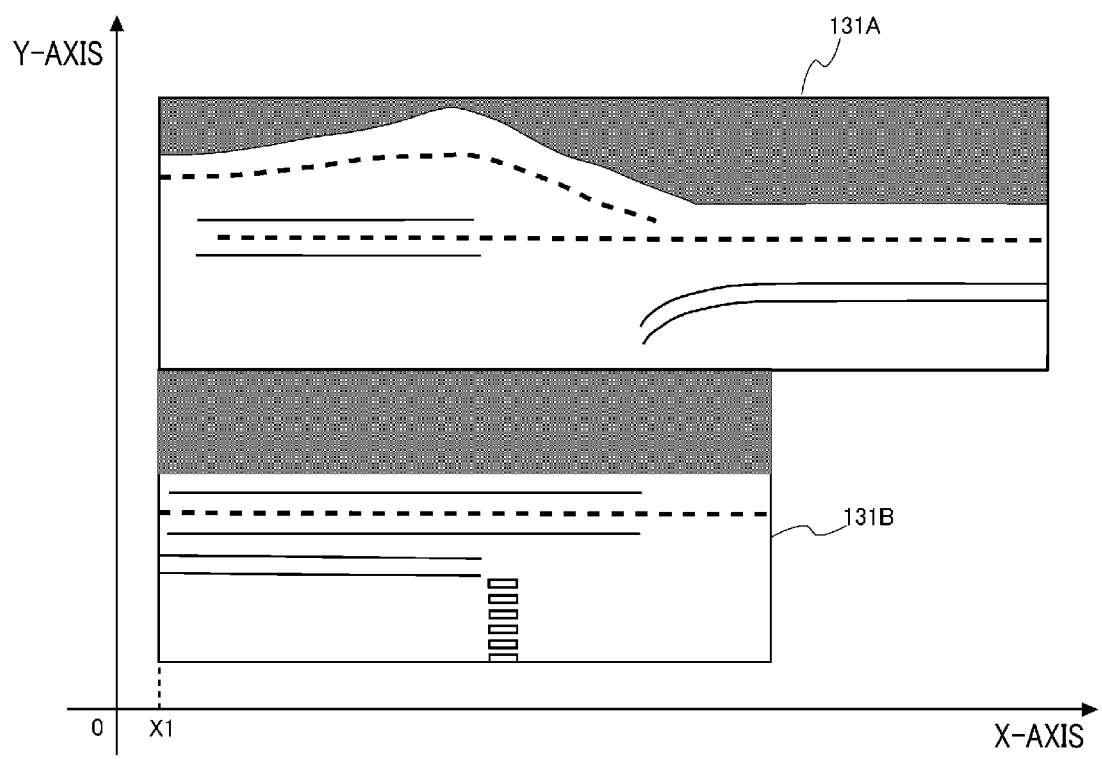
FIG. 7 is a view showing a divided linear overhead-view image stored in the non-volatile storage unit.

FIGS. 6 and 7 are views showing a divided linear overhead-view image 131 stored in the non-volatile storage unit 130.

Further, as shown in FIGS. 6 and 7, the linear overhead-view image 131 may be divided by the preset data quantity and the distance and stored in the non-volatile storage unit 130.

FIG. 6 shows a case where the non-volatile storage unit 130 stores a linear overhead-view image 131A and a linear overhead-view image 131B, which are divided into two, in different storage regions.

Further, FIG. 7 shows a case where the linear overhead-view image 131A and the linear overhead-view image 131B divided by the preset data quantity and the distance are stored in the storage region included in the non-volatile storage unit 130, with a horizontal axis being an X-axis and a vertical axis being a Y-axis, in a state where a coordinate value (X1) in the X-axis direction of the storage region is aligned. In other words, FIG. 7 shows a case where the linear overhead-view image 131 is folded back by the preset data quantity and stored in the storage region of the non-volatile storage unit 130.

Since the linear overhead-view image 131 is divided into a plurality and stored in the non-volatile storage unit 130, when the overhead-view image reconstruction unit 155D reads the linear overhead-view image 131 the overhead-view image reconstruction unit 155D can refer to and read only the necessary part of the linear overhead-view image 131, and a processing load of the processor 150 can be reduced.

Further, when the linear overhead-view image 131 is stored in the non-volatile storage unit 130, the linear overhead-view image 131 may be compressed by a known image compression method.

The overhead-view image reconstruction unit 155D reads the linear overhead-view image 131 and the distance-based turning angle information 133 from the non-volatile storage unit 130. In addition, the linear overhead-view image 131 generated by the linear overhead-view image generation unit 155B and the distance-based turning angle information 133 generated by the distance-based turning angle generation unit 155C may be directly input to the overhead-view image reconstruction unit 155D.

The overhead-view image reconstruction unit 155D reconstructs the overhead-view image 200 shown in FIG. 4, using the linear overhead-view image 131 and the distance-based turning angle information 133 which are acquired.

In addition, when reading the distance-based turning angle information 133 from the non-volatile storage unit 130, the overhead-view image reconstruction unit 155D may correct the read distance-based turning angle information 133 with sensor data of another sensor and correction information. The sensor data of another sensor and the correction information include, for example, a signal received from the sensor installed on the roadside of the road, the latitude and longitude of the vehicle 1 calculated based on the GNSS signal received by the GNSS receiver 31 of the navigation device 30, and the captured image of the camera 25. The overhead-view image reconstruction unit 155D corrects the distance-based turning angle information 133 using the sensor data of another sensor and the correction information, thereby it is possible to improve the accuracy of the distance-based turning angle information 133 and to improve the accuracy of the overhead-view image 200 reconstructed by the overhead-view image reconstruction unit 155D.

Returning to FIG. 1, the functional blocks included in the processor 150 will be described continuously.

The position estimation unit 156 starts the operation when the operation mode of the automatic parking device 100 shifts to the position estimation mode 230.

The position estimation unit 156 estimates a position of the vehicle 1 in the parking lot coordinate system based on the point cloud map 135 when the point cloud data near the current position of the vehicle 1 is registered in the point cloud map 135. The position estimation unit 156 collates the sensor data of the external sensor group 20 with the information of the point cloud map 135 to estimate the current position of the vehicle 1.

The parking route generation unit 157 generates, using a known method, a parking route from the position of the vehicle 1 calculated by the position estimation unit 156 to the parking position registered in the point cloud map 135. The parking route generation unit 157 outputs the generated parking route to the control information generation unit 158.

The control information generation unit 158 generates, based on the parking route generated by the parking route generation unit 157, control information used to control the traveling of the vehicle 1. Such control information is information used to travel the vehicle 1 along the parking route, and includes information used to control steering, driving, and braking, respectively.

The point cloud data verification unit 153 determines that the point cloud data can be used as a map, the display control unit 159 causes the display device 80 to display a guide "Do you want to store surrounding areas of the current traveling route as a map?". When the response button 71 is pressed by a user, the point cloud data is registered as parking lot data in the point cloud map 135, and the map storage mode 220 ends.

In addition, when the point cloud data verification unit 153 determines that the point cloud data cannot be used as a map, the display control unit 159 causes the display device 80 to display a guide "Information necessary for a map is insufficient, and please travel on the same route again when you want to perform automatic parking here".

The mode switching unit 160 changes the operation mode of the automatic parking device 100. The operation mode of the automatic parking device 100 includes a normal traveling mode 210, the map storage mode 220, the position estimation mode 230, an automatic parking mode 240, and a give-up mode 250.

[3. Operation Mode of Automatic Parking Device 100]

Figure 8:
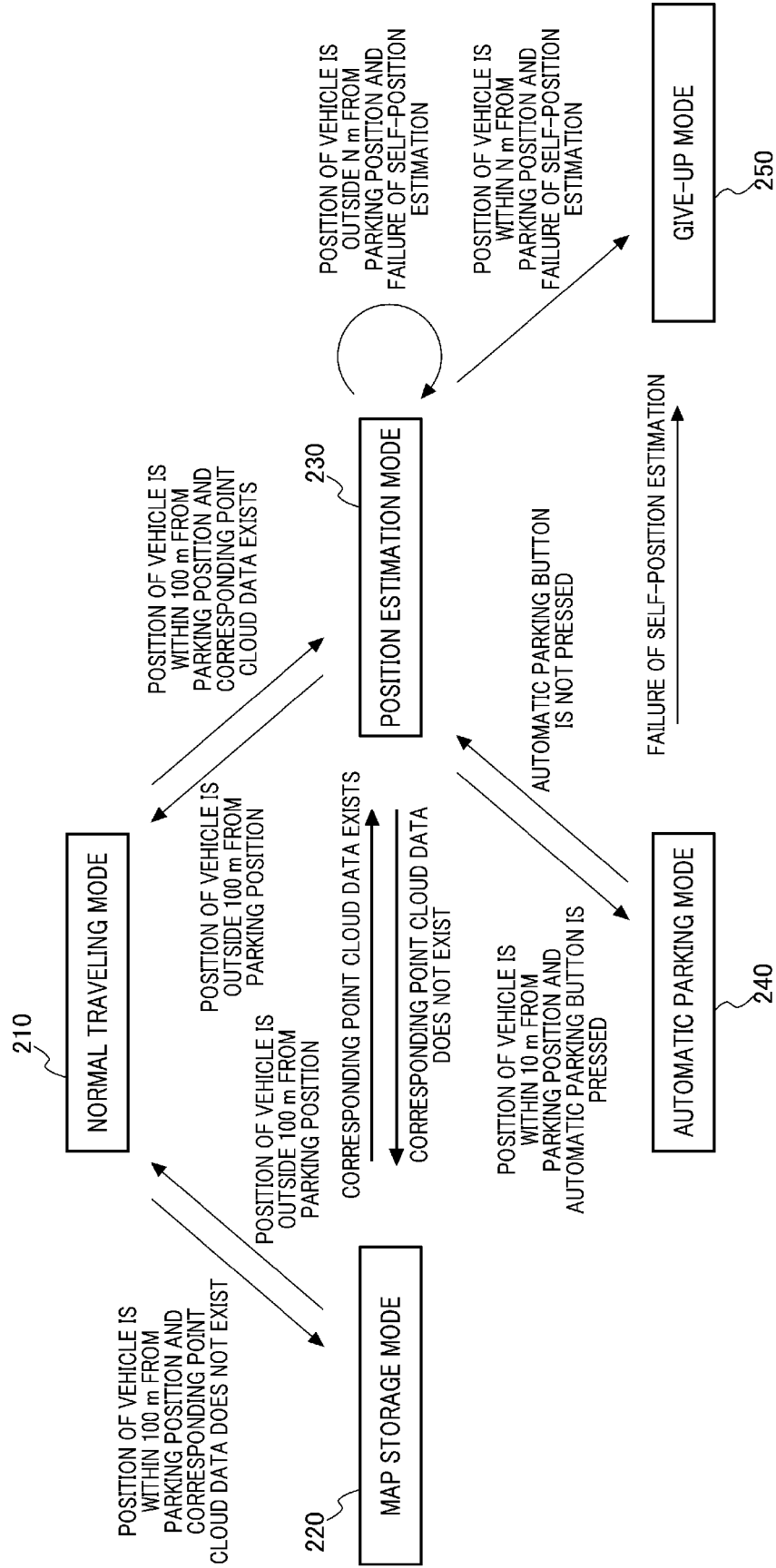
FIG. 8 is a view showing operation modes provided in an automatic parking device and change conditions between the operation modes.

FIG. 8 is a view showing operation modes of the automatic parking device 100 and change conditions between the operation modes.

The normal traveling mode 210 is a normal traveling mode. When the operation mode is the normal traveling mode, the automatic parking device 100 does not detect the point cloud data of the point cloud forming the landmark or estimate the position of the vehicle 1 based on the point cloud map 135. In the case of the normal traveling mode, the automatic parking device 100 determines whether conditions for shifting to the map storage mode 220 or the position estimation mode 230 are established.

The map storage mode 220 is a mode of detecting the point cloud data of the point cloud forming the landmark based on the sensor data of the external sensor group 20 and registering the detected point cloud data in the point cloud map 135 when the parking position and the point cloud data near the parking position are not registered in the point cloud map 135. When the operation mode is the map storage mode 220, the automatic parking device 100 detects, based on the sensor data of the external sensor group 20, information on white lines pained on the road surface of the parking lot or on obstacles, information on the parking position, and a traveling route. The automatic parking device 100 registers the detected information in the point cloud map 135.

In the case of shifting to the map storage mode 220, the automatic parking device 100 secures a temporary recording region in the RAM 120. The automatic parking device 100 repeats the following process until the map storage mode 220 ends or transitions another mode. In other words, the automatic parking device 100 detects, based on the sensor data input from the external sensor group 20, the point cloud forming the landmark existing around the vehicle 1. Further, the automatic parking device 100 calculates the moving amount and the moving direction of the vehicle 1 until the current capturing from the previous capturing of the camera 25. Then, the automatic parking device 100 excludes, based on the moving amount and the moving direction of the vehicle 1, point cloud data corresponding to a person or a moving object, from the detected point cloud data.

Further, the automatic parking device 100 registers, together with the point cloud data, the latitude and longitude indicating the position of the vehicle 1 input from the navigation device 30 in the point cloud map 135. The automatic parking device 100 repeats such a process. Coordinates indicated by the point cloud data are recorded as coordinate values of the recording coordinate system. The "recording coordinate system" is treated as coordinate values of the coordinate system in which the position of the vehicle 1 at the start time of recording is set as origin (0,0), a traveling direction (posture) of the vehicle 1 at the start time of recording is set as a Y-axis, and a right direction of the vehicle 1 at the start time of recording is set as an X-axis. Therefore, even when the point cloud is recorded in the same parking lot, the recording coordinate systems set depending on the position or the posture of the vehicle 1 at the start time of recording are different from each other, and thus the point cloud forming the landmark is recorded at different coordinates.

The position estimation mode 230 is a mode of calculating the position of the vehicle 1 in the parking lot coordinate system based on the point cloud map 135 when the point cloud data near the current position of the vehicle 1 is registered in the point cloud map 135. The automatic parking device 100 collates the sensor data of the external sensor group 20 with the information of the point cloud map 135 to estimate the current position of the vehicle 1. The automatic parking device 100 detects, based on the sensor data of the external sensor group 20, white lines and obstacles existing around the vehicle 1, and collates with the point cloud map 135 to estimate the current position.

The automatic parking mode 240 is a mode of, in a state where the automatic parking button 73 is pressed by the user, generating a parking route, along which the vehicle 1 is parked at the parking position, based on the position of the vehicle 1 calculated by the position estimation mode 230 and the parking position, moving the vehicle 1 along the generated parking route, and parking the vehicle at the parking position.

The automatic parking device 100 parks the vehicle 1 at the parking position stored in the point cloud map 135, based on the current position of the vehicle 1 estimated in the position estimation mode 230 and the result of estimation of the current position of the vehicle 1 continuously performed in the automatic parking mode 240.

The give-up mode 250 is a mode in which the position of the vehicle 1 cannot be estimated by the position estimation mode 230 in the state where the automatic parking button 73 is pressed by the user. Even in such a case, the point cloud data is not collected as in the normal traveling mode 210, and the position of the vehicle 1 is not estimated unlike the position estimation mode 230.

The mode switching unit 160 compares the latitude and longitude of the parking position with the latitude and longitude indicating the current position of the vehicle 1 input from the navigation device 30, thereby changing the operation mode. The mode switching unit 160 shifts the operation mode to the map storage mode 220 when the point cloud data near the point where the vehicle 1 is currently traveling is not registered in the point cloud map 135. Further, the mode switching unit 160 shifts the operation mode to the position estimation mode 230 when the point cloud data near the point where the vehicle 1 is currently traveling is registered in the point cloud map 135.

When the operation mode of the automatic parking device 100 is in the state of the map storage mode 220, the mode switching unit 160 changes the operation mode to the normal traveling mode 210 when the vehicle 1 is located outside a certain range centered on the parking position by comparison between the latitude and longitude of the parking position and the latitude and longitude information indicating the current position of the vehicle 1 acquired from the navigation device 30. Further, the mode switching unit 160 changes the operation mode to the position estimation mode 230 when the vehicle 1 invades the section, in which the point cloud data is registered in the point cloud map 135, on the way.

Further, regarding the determination of whether the vehicle 1 enters the section in which the point cloud data is registered in the point cloud map 135, the automatic parking device 100 determines that the vehicle enters the section, in which the point cloud data is registered in the point cloud map 135, when the landmark exists within a present distance from the latitude and longitude indicating the current position of the vehicle 1 by comparison between the latitude and longitude of the current position of the vehicle 1 and the latitude and longitude of the landmark registered in the point cloud map 135. In addition, the automatic parking device 100 determines that the vehicle 1 does not enter the section, in which the point cloud data is registered in the point cloud map 135, when the landmark does not exist within the present distance from the latitude and longitude indicating the current position of the vehicle 1.

When the operation mode of the automatic parking device 100 is in the state of the position estimation mode 230, the mode switching unit 160 changes the operation mode to the normal traveling mode 210 when the vehicle 1 goes out of the certain range centered on the parking position by comparison between the latitude and longitude of the vehicle 1 acquired from the navigation device 30 and the latitude and longitude of the parking position registered in the point cloud map 135. Further, the mode switching unit 160 changes the operation mode to the map storage mode 220 when the vehicle 1 invades an unregistered section of the point cloud map 135 on the way.

The mode switching unit 160 changes the operation mode to the automatic parking mode 240 only when the position of the vehicle 1 is successfully estimated in the position estimation mode 230, the vehicle 1 is located within the predetermined range from the parking position, and the user pressed the automatic parking button 73. In other words, with approval of the user, the automatic parking is executed in which the vehicle 1 is automatically parked at the parking position. In addition, the mode switching unit 160 shifts the operation mode to the give-up mode 250 when the position of the vehicle 1 fails in estimation in the position estimation mode 230.

[4. Operation of Linear Overhead-View Image Generation Unit 155B]

Figure 9:
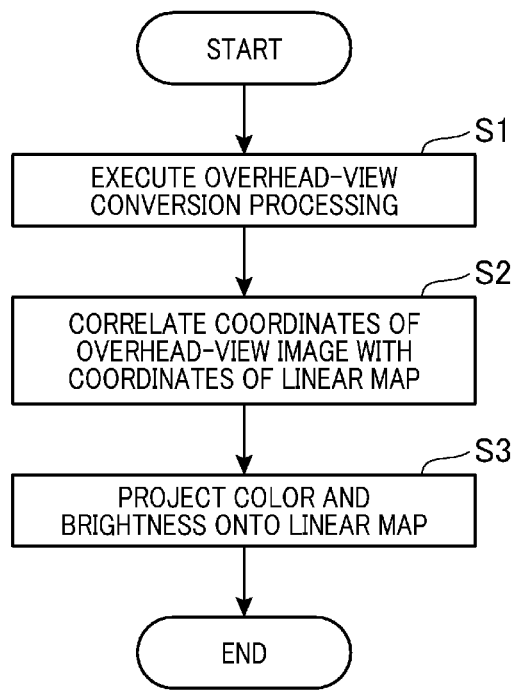
FIG. 9 is a flowchart showing an operation of the linear overhead-view image generation unit.

FIG. 9 is a flowchart showing an operation of the linear overhead-view image generation unit 155B.

The operation of the linear overhead-view image generation unit 155B will be described with reference to FIG. 9.

The linear overhead-view image generation unit 155B first executes overhead-view conversion processing (step S1). The linear overhead-view image generation unit 155B acquires the captured image of the camera 25 from the RAM 120. The camera 25 captures surroundings of the vehicle 1 at predetermined intervals to generate captured images, and outputs the generated captured image to the automatic parking device 100. The automatic parking device 100 causes the RAM 120 to store the input captured image. The linear overhead-view image generation unit 155B performs viewpoint conversion calculation by software, and converts the captured image acquired from the RAM 120 into an overhead-view image of the viewpoint looking down the ground from the top of the vehicle 1.

The viewpoint conversion calculation is performed using external parameters indicating mounting information of the camera 25 stored in the ROM 110 and external parameters indicating optical information inside the camera 25. The overhead-view conversion processing can be realized by a known technique as long as the captured image of the camera 25 and the external parameters exist.

Next, the linear overhead-view image generation unit 155B determines coordinates of a linear map on which the overhead-view image calculated in step S1 is projected (step S2). In other words, the linear overhead-view image generation unit 155B determines coordinates of a linear map (hereinafter, referred to as a linear map) correlated with the coordinates of the overhead-view image. The linear overhead-view image 131 generated by the linear overhead-view image generation unit 155B is an image obtained by linearly extending the overhead-view image without consideration of information on the turning as shown in FIG. 5. The linear overhead-view image generation unit 155B calculates the coordinates of the linear map, which are correlated with the coordinates of the overhead-view image, using the moving distance of the vehicle 1 calculated by the moving amount calculation unit 155A based on the sensor data of the vehicle speed sensor 41.

Next, the linear overhead-view image generation unit 155B projects color and brightness information of the overhead-view image generated in step S1 on the linear map according to the coordinates correlated with each other in step S2 to generate the linear overhead-view image 131 (step S3). Depending on the coordinates of the linear map on which the color and brightness information of the overhead-view image are projected, an overhead-view image, the overhead-view image being obtained at the previous time and an overhead-view image, the overhead-view image being obtained at the current time may overlap with each other. However, the linear overhead-view image generation unit 155B appropriately integrates the overhead-view image obtained at the previous time and the overhead-view image obtained at the current time by blending processing to generate the linear overhead-view image 131. The linear overhead-view image generation unit 155B causes the nonvolatile storage unit 130 to store the generated linear overhead-view image 131.

[5. Operation of Distance-Based Turning Angle Generation Unit 155C]

Figure 10:
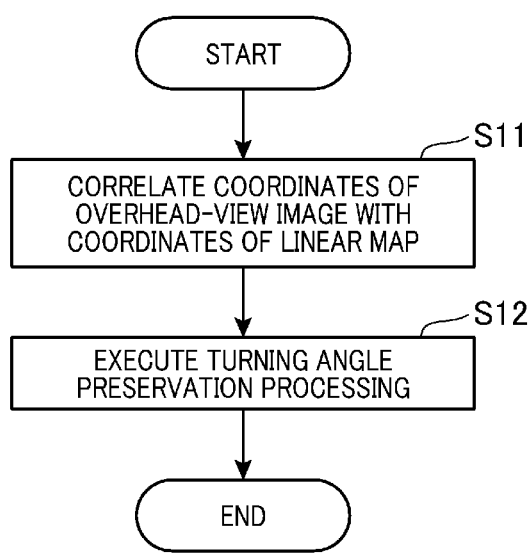
FIG. 10 is a flowchart showing an operation of a distance-based turning angle generation unit.

FIG. 10 is a flowchart showing an operation of the distance-based turning angle generation unit 155C.

The operation of the distance-based turning angle generation unit 155C will be described with reference to the flowchart shown in FIG. 10.

The distance-based turning angle generation unit 155C first determines coordinates of a linear map correlated with coordinates of an overhead-view image, similarly to the processing executed by the linear overhead-view image generation unit 155B in step S2 (step S11). The distance-based turning angle generation unit 155C calculates the coordinates of the linear map correlated with the coordinates of the overhead-view image using the moving distance of the vehicle 1 calculated by the moving amount calculation unit 155A based on the sensor data of the vehicle speed sensor 41.

Next, the distance-based turning angle generation unit 155C executes turning angle preservation processing (step S12). The distance-based turning angle generation unit 155C obtains a difference between the turning amount indicated by the sensor data of the steering angle sensor 43 measured at the previous time and the turning amount indicated by the sensor data of the steering angle sensor 43 measured at the current time. The distance-based turning angle generation unit 155C registers the obtained turning amount in the table in correlation with the coordinates of the linear map according to the coordinates correlated in step S2. The coordinates on the linear map correspond to the moving distance of the vehicle 1, and the turning amount and the moving distance of the vehicle 1 are registered in the table in correlation with each other.

[6. Operation of Overhead-View Image Reconstruction Unit 155D]

Figure 11:
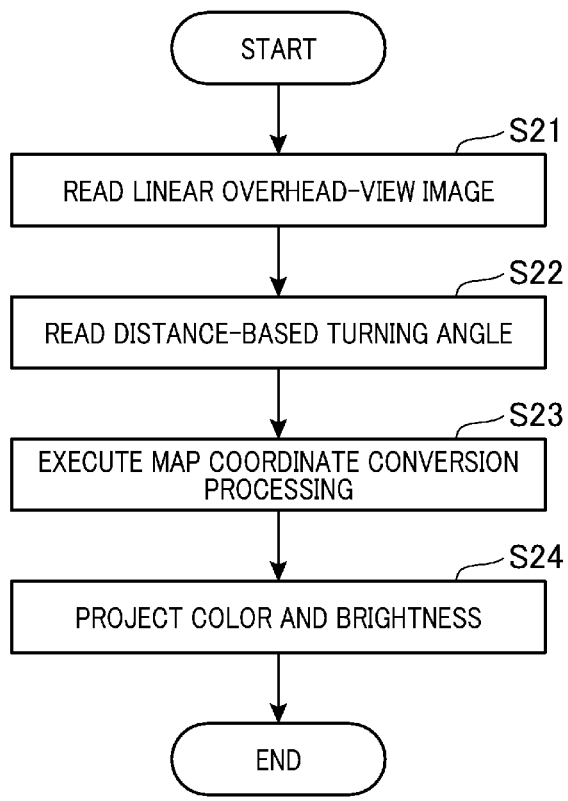
FIG. 11 is a flowchart showing an operation of an overhead-view image reconstruction unit.

FIG. 11 is a flowchart showing an operation of the overhead-view image reconstruction unit 155D.

The operation of the overhead-view image reconstruction unit 155D will be described with reference to FIG. 11.

First, the overhead-view image reconstruction unit 155D reads the linear overhead-view image 131 from the non-volatile storage unit 130 (step S21), and further reads the distance-based turning angle information 133 (step S22).

Next, the overhead-view image reconstruction unit 155D executes map coordinate conversion processing using the linear overhead-view image 131 and distance-based turning angle information 133 which are read (step S23). The overhead-view image reconstruction unit 155D calculates coordinates of the linear overhead-view image 131 correlated with coordinates of the target overhead-view image 200 using the moving distance and the turning amount of the vehicle 1 included in the distance-based turning angle information 133. By the calculation of the coordinates of the linear overhead-view image 131 correlated with the coordinates of the overhead-view image 200, it is possible to prevent omission of pixel values in the coordinates of the overhead-view image 200.

Next, the overhead-view image reconstruction unit 155D projects color and brightness information of each coordinate of the linear overhead-view image 131 on the correlated coordinates of the overhead-view image 200 according to the coordinates calculated in step S23 (step S24). Thus, the overhead-view image reconstruction unit 155D forms the overhead-view image 200 shown in FIG. 4.

[7. Operation of Automatic Parking Device in Map Storage Mode]

Figure 12:
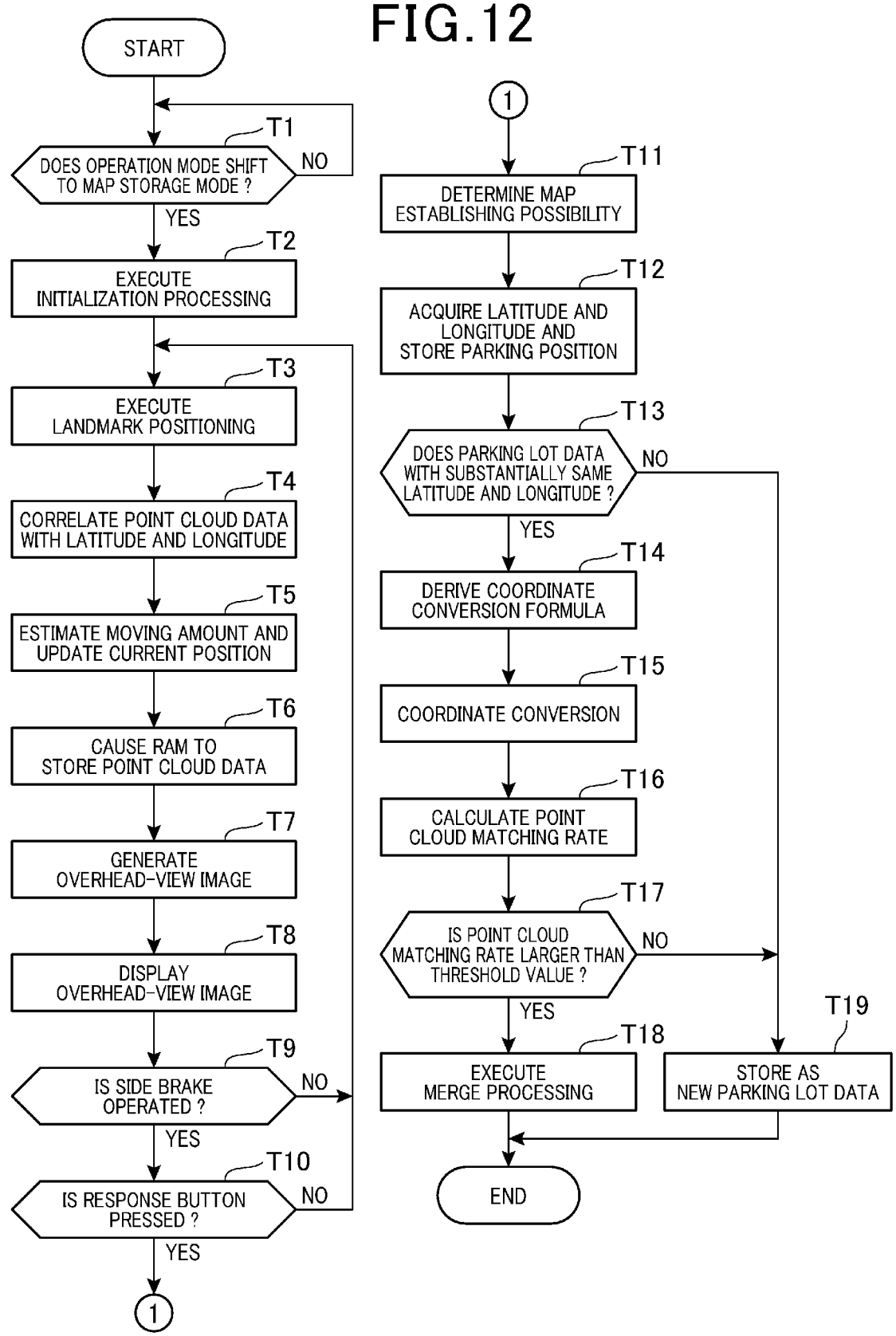
FIG. 12 is a flowchart showing an operation of the automatic parking device when the operation mode is a map storage mode.

FIG. 12 is a flowchart showing an operation of the automatic parking device 100 when the operation mode is the map storage mode 220.

The operation of the automatic parking device 100 when the operation mode is the map storage mode 220 will be described with reference to FIG. 12.

Respective steps of the flowchart shown in FIG. 12 are executed by the processor 150 of the automatic parking device 100. More specifically, respective steps of the flowchart shown in FIG. 12 are executed by control of the data acquisition unit 151, the landmark positioning unit 152, the point cloud data verification unit 153, the parking lot data registration unit 154, and the overhead-view image generation unit 155 of the processor 150.

First, the automatic parking device 100 determines whether the operation mode shifts to the map storage mode 220 (step T1). The automatic parking device 100 shifts the process to step T2 when the operation mode shifts to the map storage mode 220 (step T1/YES), but the determination in step T1 is maintained when the operation mode does not shift to the map storage mode 220 (step T1/NO).

When the operation mode shifts to the map storage mode 220 (step T1/YES), the automatic parking device 100 executes initialization processing of the RAM 120 and secures a new recording region in the RAM 120 (step T2). The automatic parking device 100 causes the RAM 120 to store the point cloud data detected by the landmark positioning and the latitude and longitude indicating the current position of the vehicle 1 in the secured storage region.

Next, the automatic parking device 100 executes landmark positioning (step T3). Specifically, the automatic parking device 100 detects the point cloud data of the point cloud forming the landmark based on the captured image of the camera 25 and the sensor data of the radar 21 and the sonar 23. The coordinates of the point cloud data detected here is coordinates of the recording coordinate system. Next, the automatic parking device 100 correlates the detected point cloud data with the latitude and longitude input from the navigation device 30 (step T4).

Next, the automatic parking device 100 obtains the moving distance of the vehicle 1 between the previous capturing and the current capturing of the camera 25, and updates the current position of the vehicle 1 in the recording coordinate system (step T5). For example, the automatic parking device 100 estimates the moving amount of the vehicle 1 from a change in the position of a subject existing on the road surface in the captured image of the camera 25. Further, when the navigation device 30 is equipped with a high-precision GNSS receiver having a small error, the automatic parking device 100 may estimate the moving amount of the vehicle 1 using the latitude and longitude input from the navigation device 30.

Next, the automatic parking device 100 causes the RAM 120 to store the point cloud data indicating the position of the landmark detected by the landmark positioning in step T3, as the coordinates of the recording coordinate system (step T6).

Next, the automatic parking device 100 generates an overhead-view image 200 with the overhead-view image generation unit 155 (step T7). More specifically, the overhead-view image generation unit 155 generates a linear overhead-view image 131 and distance-based turning angle information 133 based on the captured image of the camera 25 and the sensor data of the vehicle speed sensor 41. Next, the overhead-view image generation unit 155 generates the overhead-view image 200 based on the linear overhead-view image 131 and the distance-based turning angle information 133 which are generated.

When generating the overhead-view image 200, the automatic parking device 100 causes the display device 80 to display the generated overhead-view image 200 (step T8). When causing the display device 80 to display the overhead-view image 200, the automatic parking device 100 may display the point cloud data detected by the landmark positioning in step T3 to be superimposed on the overhead-view image 200. The automatic parking device 100 displays the point cloud data at the position of the overhead-view image 200 corresponding to the position of the landmark.

Next, the automatic parking device 100 determines whether a signal for notifying that the side brake is operated is input from the vehicle control device 50 (step T9). When the signal for notifying that the side brake is operated is not input from the vehicle control device 50 (step T9/NO), the process returns to step T3, and the automatic parking device 100 performs the landmark positioning again.

In addition, when the signal for notifying that the side brake is operated is input from the vehicle control device 50 (step T9/YES), the automatic parking device 100 determines whether to accept the operation of the response button 71 (step T10). The automatic parking device 100 determines whether an operation signal corresponding to the operation of the response button 71 is input, and determines whether the response button 71 is operated. When the response button 71 is not operated even after the lapse of a predetermined time (step T10/NO), the process returns to step T3, and the automatic parking device 100 performs the landmark positioning again.

Further, when the operation signal corresponding to the operation of the response button 71 is input (step T10/YES), the automatic parking device 100 determines establishing possibility of the point cloud data as a map (step T11). The automatic parking device 100 determines whether the above-described two verification conditions are established, and determines establishing possibility of the point cloud data as a map. The automatic parking device 100 causes the RAM 120 to store the determination result of the establishing possibility of the point cloud data as a map.

Next, the automatic parking device 100 acquires latitude and longitude information indicating the current position of the vehicle 1 input from the navigation device 30, and causes the RAM 120 to store the parking position, that is, coordinates of four corners of the vehicle 1 as the current position of the vehicle 1 (step T12). The coordinates of these four corners are coordinates of the recording coordinate system.

Next, the automatic parking device 100 determines whether the parking lot data of the latitude and longitude substantially coinciding with the latitude and longitude acquired in step T12 is registered in the point cloud map 135 (step T13). When the parking lot data of the latitude and longitude substantially coinciding with the acquired latitude and longitude is not registered in the point cloud map 135 (step T13/NO), the automatic parking device 100 registers the point cloud data stored in the RAM 120 or the coordinates indicating the latitude and longitude acquired in step T12 and the parking position in the point cloud map 135, as new parking lot data (step T19). Further, the automatic parking device 100 causes the non-volatile storage unit 130 to store the linear overhead-view image 131 generated in step T7 and the distance-based turning angle information 133 (step T19). In addition, when dividing the linear overhead-view image 131 and causing the non-volatile storage unit 130 to store the divided images, the automatic parking device 100 divides the linear overhead-view image 131 with a preset constant distance or a constant data quantity, and causes the non-volatile storage unit 130 to store the respective divided images of the linear overhead-view image 131.

When the parking lot data of the latitude and longitude substantially coinciding with the latitude and longitude acquired in step T12 is registered in the point cloud map 135 (step T13/YES), the automatic parking device 100 converts the recording coordinate system, which is a coordinate system of the point cloud data stored in the RAM 120 based on the parking position being the current position of the vehicle 1, into a coordinate system of point cloud data of target parking lot data. The target parking lot data is the parking lot data of the latitude and longitude substantially coinciding with the latitude and longitude acquired in step T12. The automatic parking device 100 derives a coordinate conversion formula that converts the coordinates of the recording coordinate system into the coordinates of the parking lot coordinate system (step T14), such that the parking position included in the target parking lot data coincides with the parking position stored in the RAM 120 in step T12.

Next, the automatic parking device 100 converts the coordinate system of the point cloud data of the landmark stored in the RAM 120 into the parking lot coordinate system, which is the coordinate system of the target parking lot data, using the coordinate conversion formula derived in step T14 (step T15).

Next, the automatic parking device 100 calculates a point cloud matching rate IB between the point cloud data stored in the RAM 120 and the point cloud data of the target parking lot data (step T16). The point cloud matching rate IB is calculated by Formula (1) as follows.

$$IB = 2 \times Din/(D1+D2) \quad \text{Formula (1)}$$

In Formula (1) described above, the "Din" represents the number of points in which a distance between each point of the point cloud data subjected to coordinate conversion in step T15 and each point of the point cloud data of the target parking lot data is within a predetermined distance. In Formula (1), the "D1" represents the number of pieces of point cloud data stored in the RAM 120, that is, the number of point, and the "D2" represents the number of pieces of point cloud data included in the target parking lot data, that is, the number of points.

Next, the automatic parking device 100 determines whether the point cloud matching rate IB obtained in step T16 is larger than a preset threshold value (step T17). When the point cloud matching rate IB is larger than the threshold value (step T17/YES), the automatic parking device 100 executes merge processing. Specifically, the automatic parking device 100 adds the point cloud data subjected to the coordinate conversion in step T15 to the target parking lot data.

Further, when the point cloud matching rate IB is equal to or smaller than the threshold value (step T17/NO), the automatic parking device 100 registers the point cloud data stored in the RAM 120 or the coordinates indicating the latitude and longitude acquired in step T12 and the parking position in the point cloud map 135, as new parking lot data (step T19). Further, the automatic parking device 100 causes the non-volatile storage unit 130 to store the linear overhead-view image 131 generated in step T7 and the distance-based turning angle information 133 (step T19).

[8. Operation of Automatic Parking Device in Position Estimation Mode]

Figure 13:
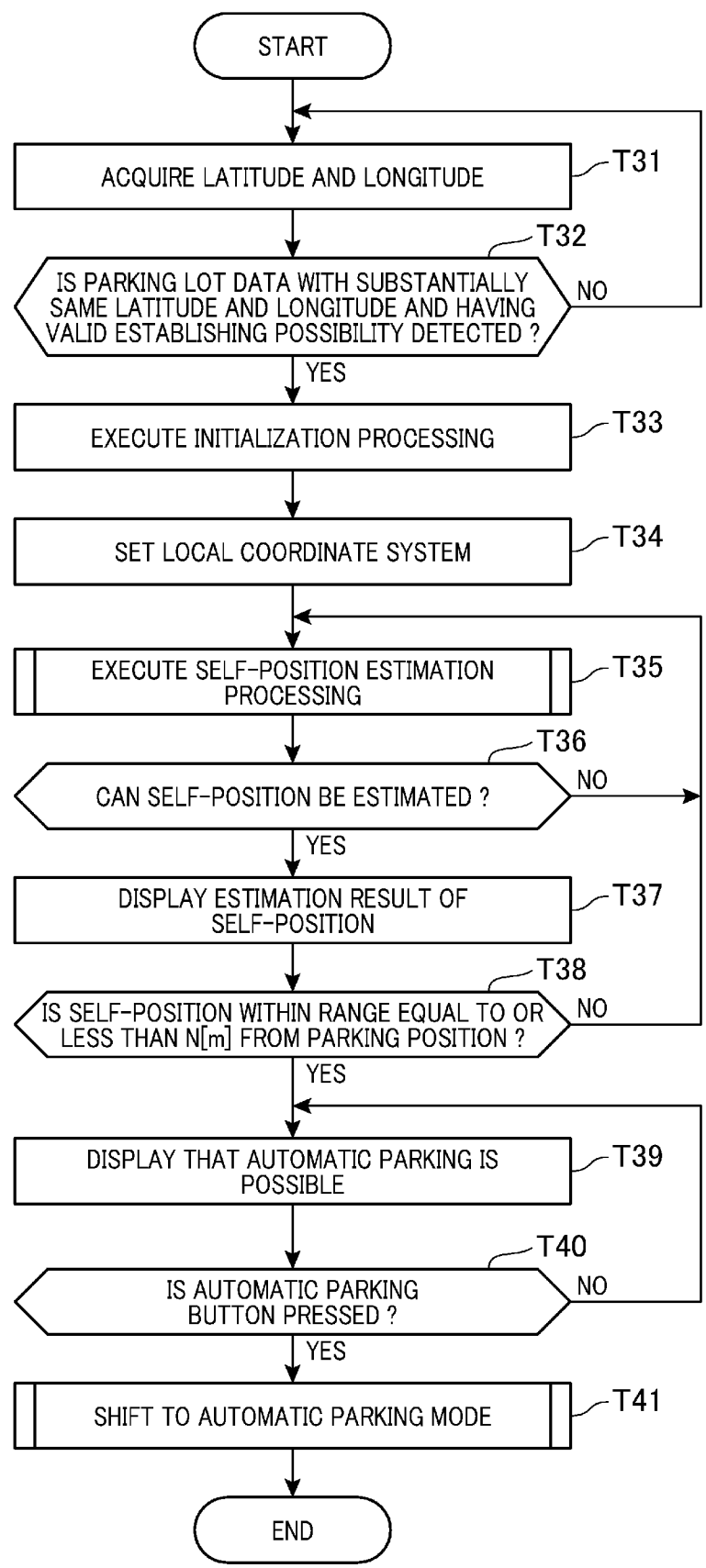
FIG. 13 is a flowchart showing an operation of the automatic parking device when the operation mode is a self-position estimation mode.

FIG. 13 is a flowchart showing an operation of the automatic parking device 100 when the operation mode is the position estimation mode 230.

The operation of the automatic parking device 100 in the position estimation mode 230 will be described with reference to the flowchart shown in FIG. 13. Respective steps of the flowchart shown in FIG. 13 are executed by the processor 150 of the automatic parking device 100. More specifically, the respective steps of the flowchart shown in FIG. 13 are executed by control of the position estimation unit 156 of the processor 150.

When the automatic parking device 100 determines that the vehicle 1 moves to the vicinity of the registration spot and the parking lot data around the registration spot is already registered in the point cloud map 135, the operation mode shifts to the position estimation mode 230.

First, the automatic parking device 100 acquires latitude and longitude information input from the navigation device 30 (step T31). Next, the automatic parking device 100 detects, from the parking lot data included in the point cloud map 135, parking lot data including point cloud data having the latitude and longitude substantially coinciding with the latitude and longitude, which is the current position of the vehicle 1 acquired in step T31, and having establishing possibility which is valid (established) as a map (step T32).

When the parking lot data cannot be detected (step T32/NO), the process returns to step T31, and the automatic parking device 100 acquires latitude and longitude information input from the navigation device 30. Further, when the parking lot data can be detected (step T32/YES), the automatic parking device 100 executes the initialization processing of the RAM 120 (step T33), and initializes the local surrounding information 121 stored in the RAM 120 and the current position of the vehicle 1. When the existing information is stored in the RAM 120, the automatic parking device 100 erases such information, and sets a new coordinate system. The coordinate system set here is called a local coordinate system.

Next, the automatic parking device 100 sets, based on the position and posture (azimuth) of the vehicle 1 at the time of execution of the initialization processing, the local coordinate system (step T34). For example, the automatic parking device 100 sets the position of the vehicle 1 at the time of initialization of the RAM 120 as an origin of the local coordinate system, and sets the X-axis and the Y-axis according to the orientation of the vehicle 1 at the time of execution of the initialization processing. In addition, the current position of the vehicle 1 is set to the origin (0,0) by the initialization of the current position.

Next, the automatic parking device 100 executes self-position estimation processing (step T35). The self-position estimation processing is processing of estimating the position of the vehicle 1 in the parking lot coordinate system. Details of such processing will be described with reference to a flowchart shown in FIG. 15.

Next, the automatic parking device 100 determines whether the self-position can be estimated by the self-position estimation processing in step T35 (step T36). When the self-position cannot be estimated (step T36/NO), the process returns to step T35, and the automatic parking device 100 executes the self-position estimation processing again. Further, when the self-position can be estimated (step T36/YES), the automatic parking device 100 causes the display device 80 to display the overhead-view image 200 and the self-position estimation result on the map (step T37).

Next, the automatic parking device 100 determines whether the self-position estimated by the self-position estimation processing in step T35 is within a range equal to or less than a preset distance (N[m]) from the parking position of the parking lot data detected in step T51 (step T38). Here, N represents an arbitrary natural number. When the automatic parking device 100 determines that the estimated self-position is not within the preset distance from the parking position of the parking lot data (step T38/NO), the process returns to step T35.

In addition, when the estimated self-position is within the preset distance from the parking position of the parking lot data (step T38/YES), the automatic parking device 100 causes the display device 80 to display a message that the automatic parking is possible (step T39). Then, the automatic parking device 100 determines whether the automatic parking button 73 is pressed (step T40). When the automatic parking device 100 determines that the automatic parking button 73 is not pressed (step T40/NO), the process returns to step T39.

In addition, when the automatic parking button 73 is pressed (step T40/YES), the operation mode shifts to the automatic parking mode 240, and the automatic parking device 100 executes automatic parking processing (step T41). Details of the automatic parking processing will be described with reference to a flowchart shown in FIG. 17.

Figure 14:
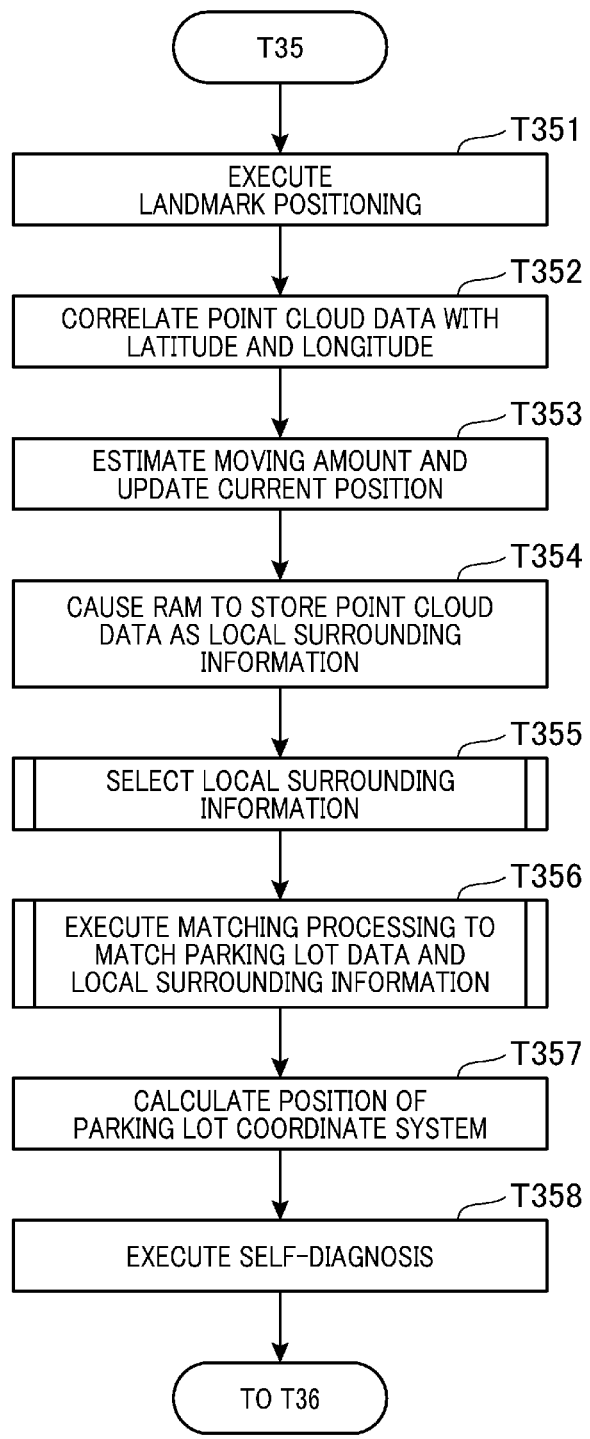
FIG. 14 is a flowchart showing details of self-position estimation processing.

FIG. 14 is a flowchart showing details of the self-position estimation processing in step T35.

The details of the self-position estimation processing will be described with reference to FIG. 14.

Processes of steps T351 to T354 shown in FIG. 14 are substantially similar to the processes of steps T3 to T6 described with reference to FIG. 12. Therefore, details of steps T351 to T354 will not be described. However, step T354 differs from step T6 in that the point cloud data is stored as the local surrounding information 121 when the point cloud data is stored in the RAM 120.

When the point cloud data is stored in the RAM 120 as the local surrounding information 121, the automatic parking device 100 selects the local surrounding information 121 (step T355). The automatic parking device 100 selects, from the point cloud data included in the local surrounding information 121, point cloud data to be used for matching processing to be executed in next step T356. The point cloud data included in the local surrounding information 121 differs in overall shape from the point cloud map 135 due to a cumulative error of the current position of the vehicle 1 estimated by the autonomous navigation, and thus may not be used for execution of the matching processing. When the selection processing of the local surrounding information 121 is executed, a point cloud with a small shape error and a matching range is adaptively selected.

Next, the automatic parking device 100 executes matching processing (step T356). In the matching processing, a coordinate conversion formula is obtained to convert the coordinates of the local coordinate system into the coordinates of the parking lot coordinate system based on a corresponding relation between the parking lot coordinate system and the local coordinate system. Details of the matching processing will be described with reference to a flowchart shown in FIG. 16.

Next, the automatic parking device 100 calculates coordinates of the parking lot coordinate system indicating a self-position (step T357). The automatic parking device 100 converts the coordinates of the local coordinate system indicating the current position of the vehicle 1 into the coordinates of the parking lot coordinate system, using the coordinates of the local coordinate system indicating the current position of the vehicle 1 included in the local surrounding information 121 updated in step T353 and the coordinate conversion formula obtained in step T355. The automatic parking device 100 sets the converted coordinates of the parking lot coordinate system as a self-position.

Next, the automatic parking device 100 executes self-diagnosis for determining reliability of the self-position calculated in step T357 (step T358). The automatic parking device 100 executes the self-diagnosis based on three indexes to be described below, for example.

A first index is an error between the moving amount of the vehicle 1 estimated by the known dead reckoning technique using the outputs of the vehicle speed sensor 41 and the steering angle sensor 43 and the moving amount in a predetermined period estimated by the self-position estimation. The automatic parking device 100 determines that the reliability is low when the difference between the estimated moving amount of the vehicle 1 and the moving amount in the predetermined period estimated by the self-position estimation is larger than a preset threshold value.

A second index is an error amount of the corresponding point calculated at the time of the matching processing. The automatic parking device 100 determines that the reliability is low when the error amount is larger than a preset threshold value.

A third index is a determination result of whether a similar solution exists. The automatic parking device 100 determines whether a similar solution exists. When a similar solution is searched for, such as translating from the obtained solution by the width of the parking frame, if there are about the same number of points with corresponding point errors within a certain range, it is determined that the reliability is low. In addition, when not determining that the reliability is low in all of three indexes, the automatic parking device 100 determines that the self-position can be estimated.

Figure 15:
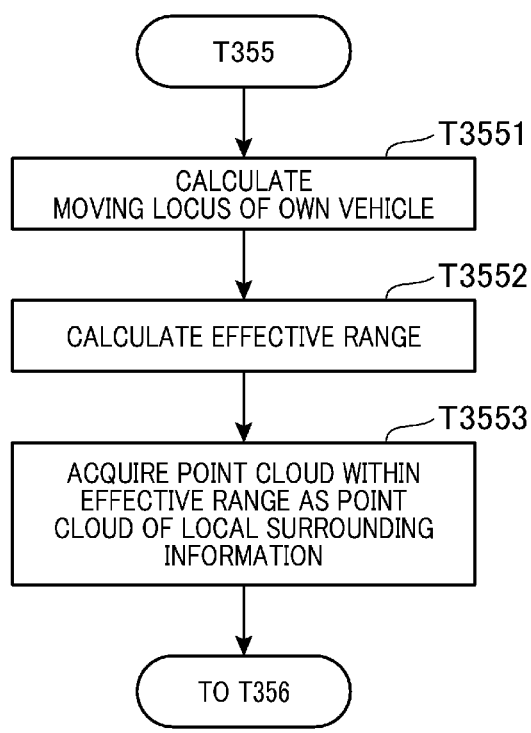
FIG. 15 is a flowchart showing a detailed operation of selection of local surrounding information.

FIG. 15 is a flowchart showing a detailed operation of the selection of the local surrounding information in step T355 shown in FIG. 14.

Details of the selection of the local surrounding information will be described with reference to the flowchart shown in FIG. 15.

First, the automatic parking device 100 calculates a moving locus of the vehicle 1 using the estimation result of the moving amount estimated in step T353 (step T3551). The automatic parking device 100 changes the coordinates indicating the current position of the vehicle 1 based on the estimated moving amount, and calculates a locus generated by interpolation between the changed coordinates, as a moving locus.

Next, the automatic parking device 100 calculates an effective range (step T3552). The automatic parking device 100 calculates, from the point cloud data included in the local surrounding information 121, a range of point cloud data having a small shape error and capable of being used for matching processing.

The effective range is determined based on a length and a shape of the moving locus of the vehicle 1 calculated in step T3551. In the point cloud data included in the local surrounding information 121, as the moving distance of the vehicle 1 increases and the turning amount of the vehicle 1 becomes larger, an estimation error of the moving amount easily occurs. On the contrary, when the point cloud data is too small, the matching processing becomes difficult. Therefore, the automatic parking device 100 acquires the point cloud data in the range traced back along the locus of the minimum distance D[m] set in advance from the current position. Then, the automatic parking device 100 accumulates the amount of change in an angle of a tangent line of the moving locus, and acquires a point cloud around the moving locus up to the point where the change is equal to or more than a preset angle threshold value θ [deg]. With respect to the moving locus, the point cloud in a range of X[m]×Y[m] preset around the moving locus is set as an effective range of the point cloud of the local surrounding information. In other words, the effective range has a shape along the obtained moving locus.

Next, the automatic parking device 100 acquires point cloud data of a point cloud within the effective range calculated in step T3552, as the point cloud data of the local surrounding information 121 (step T3553).

Figure 16:
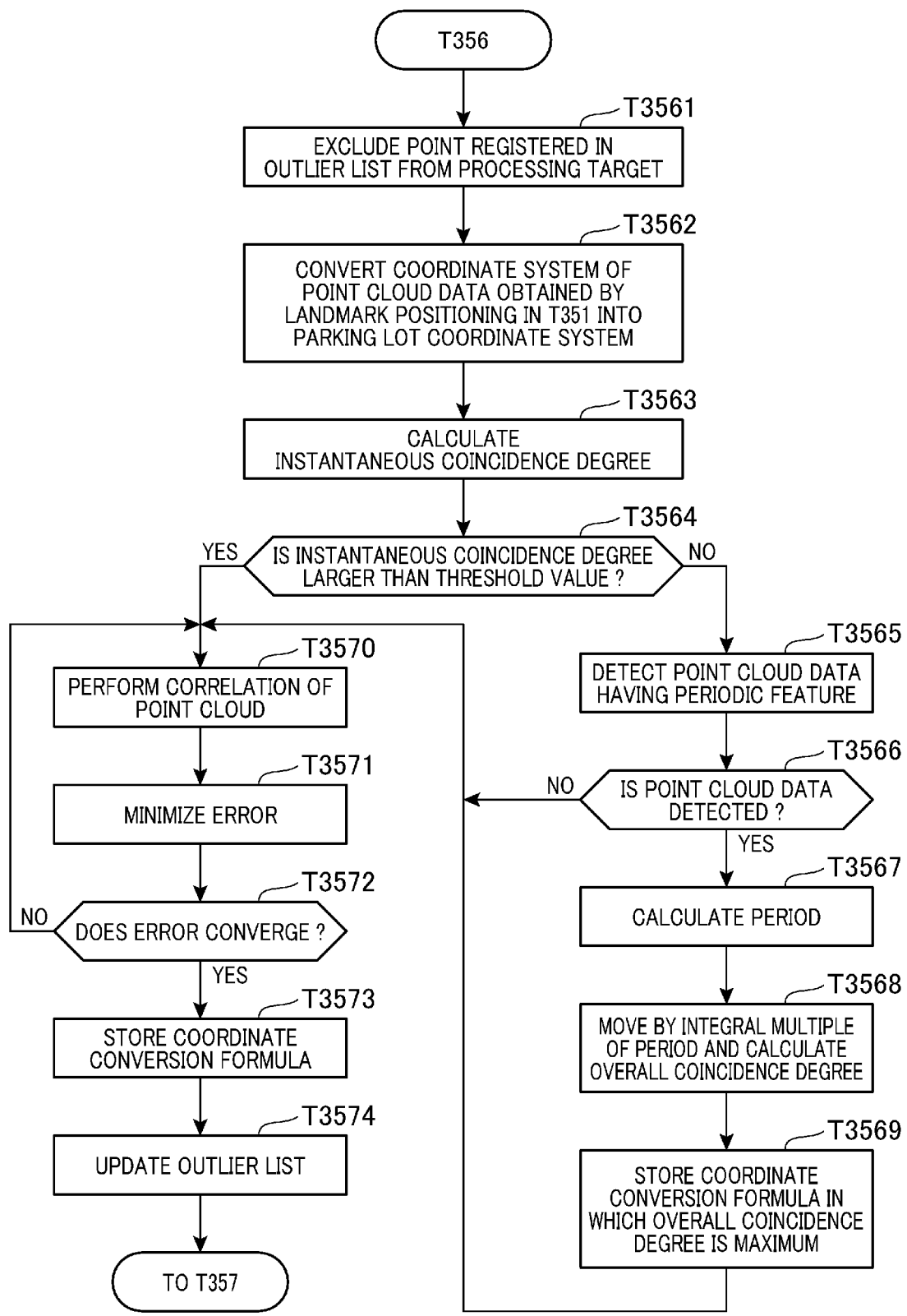
FIG. 16 is a flowchart showing a detailed procedure of matching processing.

FIG. 16 is a flowchart showing a detailed procedure of the matching processing of step T356 in FIG. 14.

Details of the matching processing will be described with reference to the flowchart shown in FIG. 16.

First, the automatic parking device 100 refers to the outlier list 123 stored in the RAM 120, and temporarily excludes points registered in the outlier list 123 among the point cloud included in the local surrounding information 121, from the processing target. The applicable range is steps T3563 to T3573 of the flowchart shown in FIG. 16, and in step T3574, the points included in the outlier list 123 are also targeted. At the time of first execution of the flowchart shown in FIG. 16, since processes of steps T3561 to T3564 cannot be executed, processes are started from step T3570.

Next, the automatic parking device 100 converts the coordinate system of the point cloud data indicating the coordinates of the point cloud forming the landmark detected by the landmark positioning in step T351 into the coordinates of the parking lot coordinate system (step T3562). The automatic parking device 100 converts, using the coordinate conversion formula calculated when the matching processing is executed last time, the coordinates of the point cloud data of the point cloud forming the landmark into the coordinates of the parking lot coordinate system.

Next, the automatic parking device 100 calculates an instantaneous coincidence degree IC (step T3563). The instantaneous coincidence degree IC is calculated by Formula (2) to be described below.

$$IC = DIin/DIall \qquad \text{Formula (2)}$$

In Formula (2) described above, the "DIin" represents the number of points, where a distance to the point registered as the parking lot data in the point cloud map 135 is equal to or less than a preset threshold value, out of the point cloud data converted into the parking lot coordinate system in step T3562. In Formula (2), the "DIall" represents the number of point clouds detected by the landmark positioning in step T351.

Next, the automatic parking device 100 compares the instantaneous coincidence degree IC calculated in step T3563 with a threshold value (step T3564). The instantaneous coincidence degree IC is equal to or less than the threshold value (step T3564/NO), the automatic parking device 100 detects point cloud data having a periodic feature from the point cloud data included in the parking lot data (step T3565). For example, the automatic parking device 100 detects point cloud data corresponding to the parking frame. Since the parking frame is painted on the road surface with a predetermined thickness, an interval corresponding to the thickness of the white line is detected as a periodic feature.

Next, the automatic parking device 100 determines whether the point cloud data having the periodic feature could have been detected (step T3566). When the automatic parking device 100 cannot detect the point cloud data having the periodic feature (step T3566/NO), the process proceeds to step T3570. In addition, when the point cloud data having the periodic feature can be detected (step T3566/YES), the automatic parking device 100 detects a period of the detected point cloud data (step T3567). Specifically, automatic parking device 100 calculates a width of the parking frame.

Next, the automatic parking device 100 calculates, using the coordinate conversion formula calculated when the matching processing is executed last time in step T356, an overall coincidence degree IW by changing the coordinate conversion formula in several ways (step T3568). The coordinate conversion formula is changed in several ways such that the position of the point cloud data shifts by an integral multiple of the period detected in step T3567. The overall coincidence degree IW is calculated by Formula (3) to be described below.

$$IW = DWin/DWall \qquad \text{Formula (3)}$$

In Formula (3) described above, the "DWin" represents the number of points, where a distance to the point registered as the parking lot data in the point cloud map 135 is equal to or less than a preset threshold value, out of the point cloud data converted, using the coordinate conversion formula, into the coordinates of the parking lot coordinate system in step T3562. In Formula (3), the "DWall" represents the number of points detected by the landmark positioning in step T351.

Next, the automatic parking device 100 causes the RAM 120 to store the coordinate conversion formula that gives the maximum overall coincidence degree IW in the overall coincidence degree IW calculated in step T3568 (step T3569).

When the determination in step T3564 is an affirmative determination (step T3564/YES), the determination in step T3566 is a negative determination (step T3566/NO), or the process in step T3569 is completed, the automatic parking device 100 correlates the point cloud data (step T3570). The automatic parking device 100 correlates the point cloud data of the parking lot data registered in the point cloud map 135 with the point cloud data of the local surrounding information 121.

When the automatic parking device 100 performs the determination in step T3564 or correlates the point cloud data in step T3570 after the process of step T3569, the point cloud data of the local surrounding information 121 uses a value subjected to coordinate conversion using the coordinate conversion formula stored in the RAM 120.

When executing the process of step T3570 after the affirmative determination in step T3564, the automatic parking device 100 uses a value subjected to coordinate conversion using the coordinate conversion formula calculated when the matching processing is executed last time in step T356.

On the other hand, when correlating the point cloud data in step T3570 after the process of the step T3566, the automatic parking device 100 uses a value subjected to coordinate conversion using the coordinate conversion formula stored in the RAM 120 in step T3569.

Next, the automatic parking device 100 changes the coordinate conversion formula such that an error of the corresponding point is minimized (step T3571). For example, the automatic parking device 100 changes the coordinate conversion formula such that the sum of indexes of distances between the points correlated with each other in step T3570 is minimized. The sum of absolute values of the distances can be adopted as the sum of the indexes of the distances between the points correlated with each other.

Next, the automatic parking device 100 determines whether the error converges (step T3572). When the automatic parking device 100 determines that the error does not converge (step T3572/NO), the process returns to step T3570. In addition, when the error converges (step T3572/YES), the automatic parking device 100 causes the RAM 120 to store the coordinate conversion formula changed by the process of step T3571 (step T3573).

Next, the automatic parking device 100 updates the outlier list 123 (step T3574). First, the automatic parking device 100 clears the existing outlier list 123 stored in the RAM 120. Next, the automatic parking device 100 converts, using the coordinate conversion formula stored in step T3573, the coordinates of the point cloud data of the local surrounding information 121 into the coordinates of the parking lot coordinate system. Next, the automatic parking device 100 calculates a distance between the point forming the point cloud data of the local surrounding information 121 and the corresponding point of the point cloud data included in the parking lot data, that is, a Euclidean distance. The automatic parking device 100 performs such a process on all points forming the point cloud data of the local surrounding information 121.

Next, when the calculated distance is longer than a preset distance, the automatic parking device 100 adds the point of the local surrounding information 121 to the outlier list 123. However, at this time, a point spatially located at an end may be added as an additional condition to the outlier list 123. The spatial end is a point acquired when the recording is started, for example, a point that is far from another point. The outlier list 123 is updated by the above processing.

An ICP (Iterative Closest Point) algorithm, which is an existing point cloud matching technique, can be used for the correlation process in step T3570, the error minimizing process in step T3571, and the process in step T3572 of determining whether the error converges.

[9. Operation of Automatic Parking Device in Automatic Parking Mode]

Figure 17:
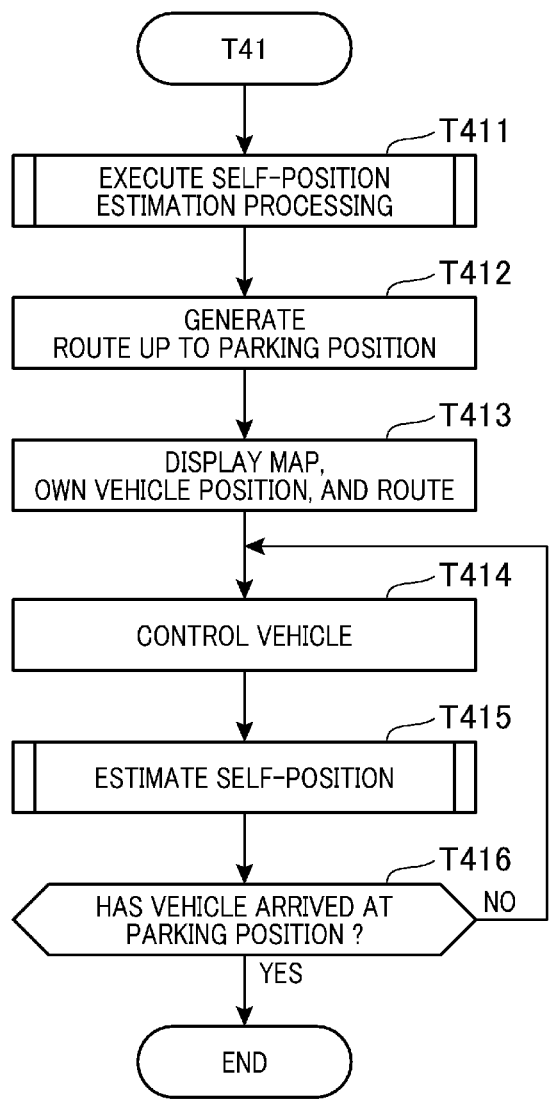
FIG. 17 is a flowchart showing an operation of an automatic parking mode.

FIG. 17 is a flowchart showing an operation in the automatic parking mode 240 in step T41 shown in FIG. 13. The operation of the automatic parking device 100 in the automatic parking mode 240 will be described with reference to the flowchart shown in FIG. 17.

The automatic parking device 100 succeeds in estimating the self-position of the vehicle 1, and changes the operation mode from the position estimation mode 230 to the automatic parking mode 240 only when the estimated position of the vehicle 1 is within a predetermined range from the parking position and the automatic parking button 73 is pressed by the user. In other words, the automatic parking mode 240 is implemented with the approval of the user.

First, the automatic parking device 100 executes self-position estimation processing (step T411).

The automatic parking device 100 estimates coordinates of the parking lot coordinate system indicating the position of the vehicle 1. Since details of step T411 are similar to those of step T35 and have already been described in the flowchart shown in FIG. 14, the details will not be described.

Next, the automatic parking device 100 generates a parking route from the position estimated in step T411 to the parking position registered in the point cloud map 135 using a known route generation method (step T412).

Next, the automatic parking device 100 causes the display device 80 to display the overhead-view image 200, the position of the vehicle 1 estimated in step T411, and the traveling route generated in step T412 (step T413). The position of the vehicle 1 is updated at a constant period, and the movement of the vehicle 1 on the overhead-view image 200 is displayed.

Next, the automatic parking device 100 generates control information corresponding to the parking route generated in step T412, and outputs the generated control information to the vehicle control device 50. The vehicle control device 50 controls the steering device 51, the driving device 53, and the brake device 55 according to the control information input from the automatic parking device 100 (step T414). Thereby, the vehicle 1 moves to the parking position along the parking route. During this time, the vehicle control device 50 continues to control the steering device 51, the driving device 53, and the brake device 55 only while the automatic parking button 73 is pressed. Further, when detecting a person or another vehicle from the captured image of the camera 25, the automatic parking device 100 operates the brake device 55 to stop the traveling of the vehicle 1.

Next, the automatic parking device 100 estimates the position of the vehicle 1 as in step T411 (step T415), and determines whether the vehicle 1 has arrived at the parking position (step T416). When the automatic parking device 100 determines that the vehicle 1 has not arrived at the parking position (step T416/NO), the process returns to step T414. Further, when the automatic parking device 100 determines that the vehicle 1 has arrived at the parking position (step T416/YES), the process ends.

[10. Description of Specific Example]

Figure 18:
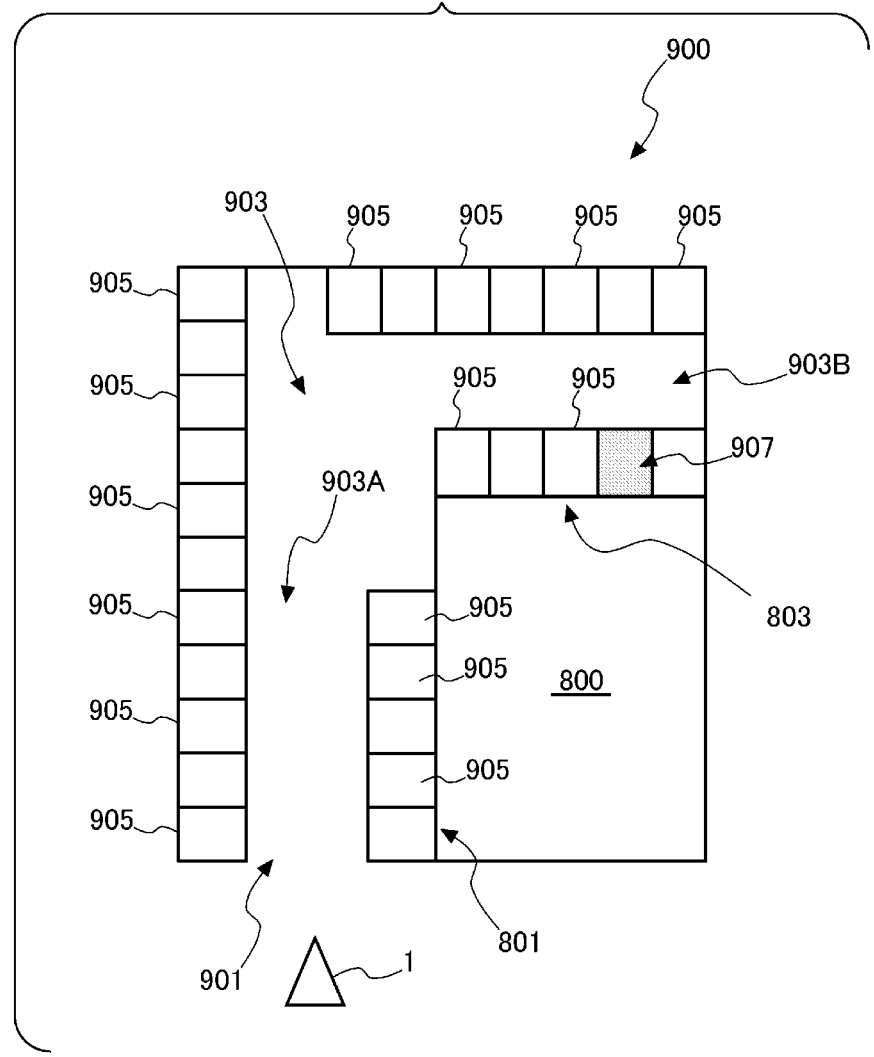
FIG. 18 is a plan view showing an example of a parking lot.

FIG. 18 is a plan view showing an example of a parking lot 900.

The parking lot 900 shown in FIG. 18 is installed adjacent to a building 800. A passageway 903 is provided in the parking lot 900. The passageway 903 includes a passageway 903A disposed along a left side surface 801 of the building 800 in a drawing view and a passageway 903B disposed along an upper surface 803 of the building 800 in the drawing view. Parking positions 905 of the parking lot 900 are disposed on both sides of the passageways 903A and 907b along these passageways 903A and 907b. In addition, an entrance/exit gate 901 of the parking lot 900 is provided at an end opposite to an end connected to the passageway 903B among ends of the passageway 903A.

A triangular figure shown in FIG. 18 represents the vehicle 1. The vehicle 1 is located outside the parking lot 900, and the orientation of the vehicle 1 faces in a direction of entering the parking lot 900. Further, the parking position 905 indicated by hatching among the plurality of parking positions 905 indicates a target parking position 907. In FIG. 18, the parking frame for partitioning the parking position 905 and the landmark other than the building 800 are not shown.

The automatic parking device 100 starts landmark positioning when the operation mode shifts to the map storage mode 220 in the vicinity of the entrance/exit gate 901 of the parking lot 900. The automatic parking device 100 causes the RAM 120 to store the point cloud data indicating the point cloud corresponding to the parking frame of the parking position 905 detected by the landmark positioning. When the operation mode is the map storage mode 220, the automatic parking device 100 repeats the above process until the parking brake is differential and the response button 71 is pressed.

Figure 19:
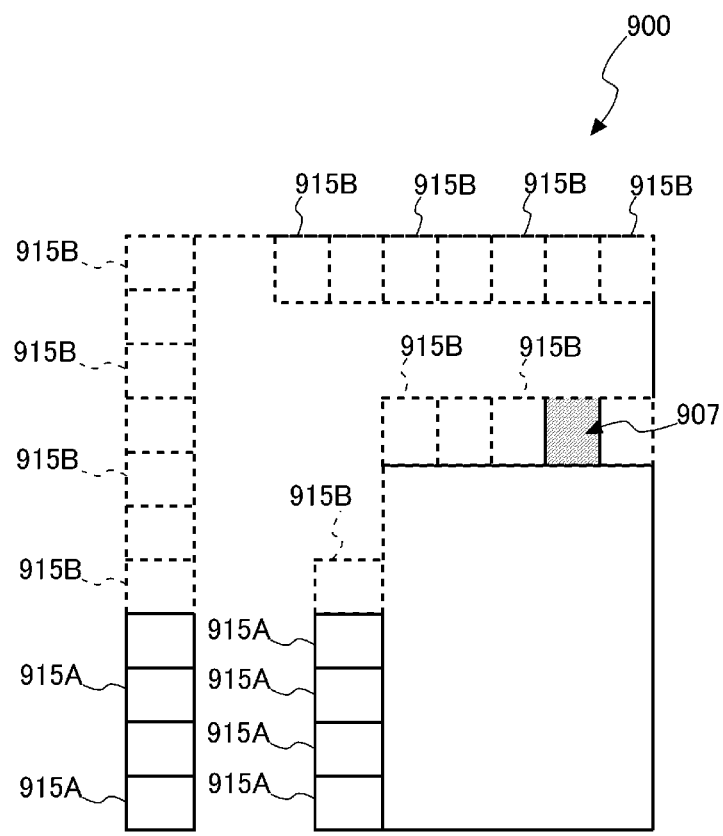
FIG. 19 is a view showing point cloud data.

FIG. 19 is a view showing point cloud data 915A. In particular, FIG. 19 is a view showing the point cloud data 915A obtained as a result of performing the landmark positioning in the parking lot 900 shown in FIG. 18 in accordance with the parking position 905 of the parking lot 900 shown in FIG. 18.

A rectangular figure shown by a solid line in FIG. 19 is obtained by visualization of the point cloud data 915A detected by the landmark positioning. In FIG. 19, a rectangular figure shown by a broken line indicates point cloud data 915B that cannot be detected by the landmark positioning. The radar 21, the sonar 23, and the camera 25 mounted on the vehicle 1 have a limited sensing range. Therefore, when the position of the vehicle 1 is located near the entrance/exit gate 901 of the parking lot 900, only the point cloud data 915A is detected that indicates the parking frame for partitioning the parking position 905 near entrance/exit gate 901 of the parking lot 900. When the vehicle 1 invades the parking lot 900 and the vehicle 1 travels on the passageway 903, the point cloud data 915A corresponding to the entire parking position 905 of the parking lot 900 can be detected.

Figure 20A:
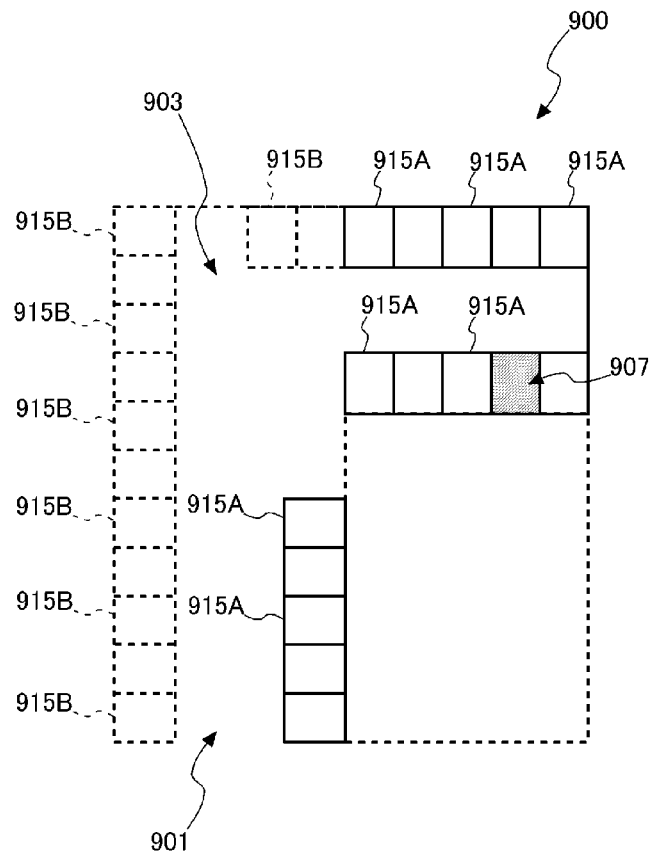
FIGS. 20A and 20B are views showing point cloud data.
Figure 20B:
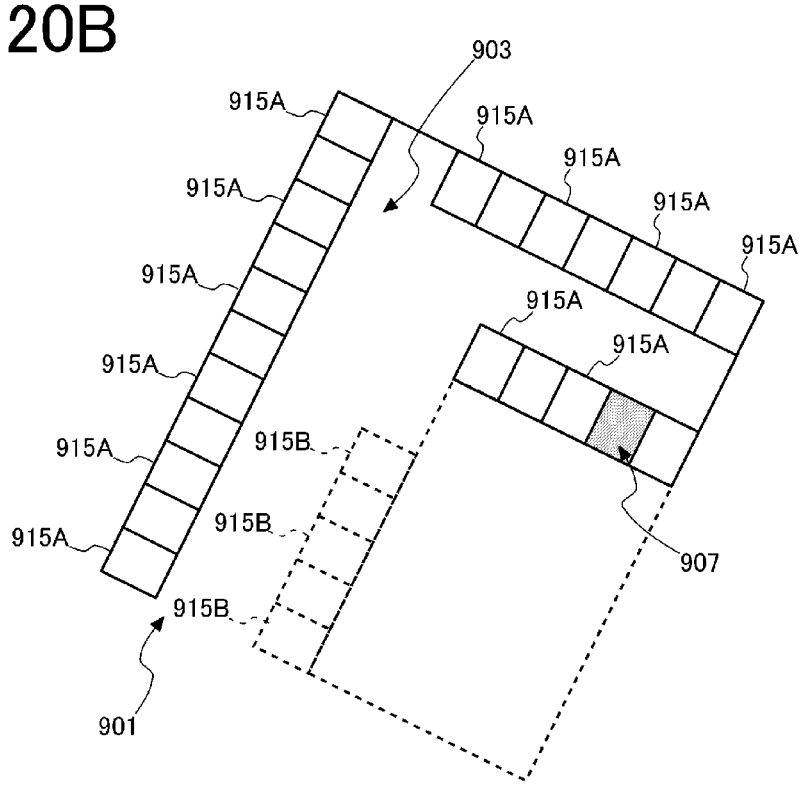

FIGS. 20A and 20B are views showing the point cloud data 915A.

The point cloud data 915A shown in FIG. 20A is data that is already registered as parking lot data in the point cloud map 135. Further, the point cloud data 915A shown in FIG. 20A is data obtained when the vehicle 1 travels on a right side of the passageway 903 and arrives at the parking position 907.

In addition, the point cloud data 915A shown in FIG. 20B indicates data newly obtained when the vehicle 1 travels in the parking lot 900. The point cloud data 915A shown in FIG. 20B is data obtained when the vehicle travels on a left side of the passageway 903 and arrives at the parking position 907.

In the point cloud data 915A shown in FIG. 20A, since the vehicle 1 travels on the right side of the passageway 903, point cloud data indicating the parking position 905 provided on the left side of the passageway 903 cannot be acquired. Further, in the point cloud data shown in FIG. 20B, since the vehicle 1 travels on the left side of the passageway 903, point cloud data indicating the parking position 905 provided on the right side of the passageway 903 cannot be acquired.

Since the posture of the vehicle 1 does not face squarely the parking lot 900 when the operation mode shifts to the map storage mode 220, the point cloud data 915A shown in FIG. 20B is tilted compared with the point cloud data 915A shown in FIG. 20A. The fact that the posture (azimuth) of the vehicle 1 does not face squarely the parking lot 900 means a state where a longitudinal direction of the vehicle 1 is not substantially parallel to the passageway 903A.

When the vehicle 1 is parked at the parking position 907 shown in FIG. 18, the parking brake is differential, and the response button 71 is pressed, the automatic parking device 100 acquires the latitude and longitude indicating the current position of the vehicle 1 from the navigation device 30. Further, the automatic parking device 100 causes the RAM 120 to store coordinates of four corners of the vehicle 1 in the recording coordinate system.

The automatic parking device 100 determines whether the latitude and longitude substantially coinciding with the latitude and longitude of the current position acquired from the navigation device 30 is registered as parking lot data in the point cloud map 135. When the latitude and longitude substantially coinciding with the latitude and longitude acquired from the navigation device 30 is not registered in the point cloud map 135, the automatic parking device 100 registers the point cloud data stored in the RAM 120 in the point cloud map 135 as new parking lot data.

In addition, when the latitude and longitude substantially coinciding with the latitude and longitude of the current position is registered as the parking lot data in the point cloud map 135, the automatic parking device 100 performs coordinate conversion with reference to the parking frame for partitioning the parking position 905, and calculates the point cloud matching rate IB.

When the point cloud matching rate IB is larger than the preset threshold value, the automatic parking device 100 integrates the point cloud data 915A shown in FIG. 20A with the point cloud data 915A shown in FIG. 20B. As a result of such integration, the point cloud data 915A indicating the parking position 905 on the left side of the passageway 903A, which is not included in the point cloud data 915A shown in FIG. 20A, is registered as parking lot data. In addition, as for the point cloud data 915A already registered as the parking lot data and indicating the parking position 905 on the right side of the passageway 903A, the number of pieces of data registered as the point cloud data 915A increases, and a density of the point cloud data 915A becomes higher.

Next, the matching processing executed in the position estimation mode 230 will be specifically described.

Figure 21:
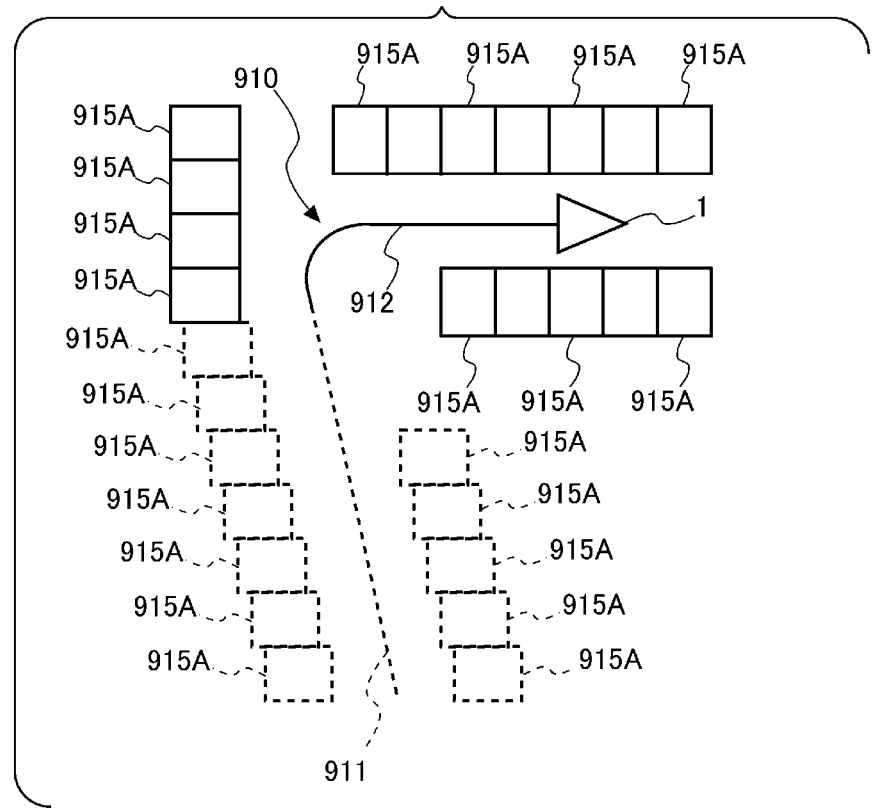
FIG. 21 is a view showing a traveling locus in the parking lot and local surrounding information obtained when a vehicle travels in the parking lot.

FIG. 21 is a view showing a traveling locus 910 in the parking lot 900 and local surrounding information 121 obtained when the vehicle 1 travels in the parking lot 900.

It is assumed that the point cloud map 135 is registered with the point cloud data 915A of all the parking positions 905 provided in the parking lot 900 shown in FIG. 18.

The point cloud data 915A shown in FIG. 21 is data stored in the RAM 120 as local surrounding information 121. More specifically, the point cloud data 915A is data detected from the captured image captured by the camera 25 until the vehicle 1 arrives at the position of the vehicle 1 shown in FIG. 21, and is data obtained when the coordinate system is converted from the local coordinate system into the parking lot coordinate system.

Further, FIG. 21 shows the traveling locus 910 of the vehicle 1. Since the vehicle 1 turns right when the vehicle 1 advances from the passageway 903A to the passageway 903B shown in FIG. 18, a turning error occurs due to a right turn. Therefore, the shape of the point cloud data 915A registered as the local surrounding information 121 changes, and the parking lot data registered in the point cloud map 135 does not coincide with the point cloud data 915A of the local surrounding information 121 even by matching.

Figure 22:
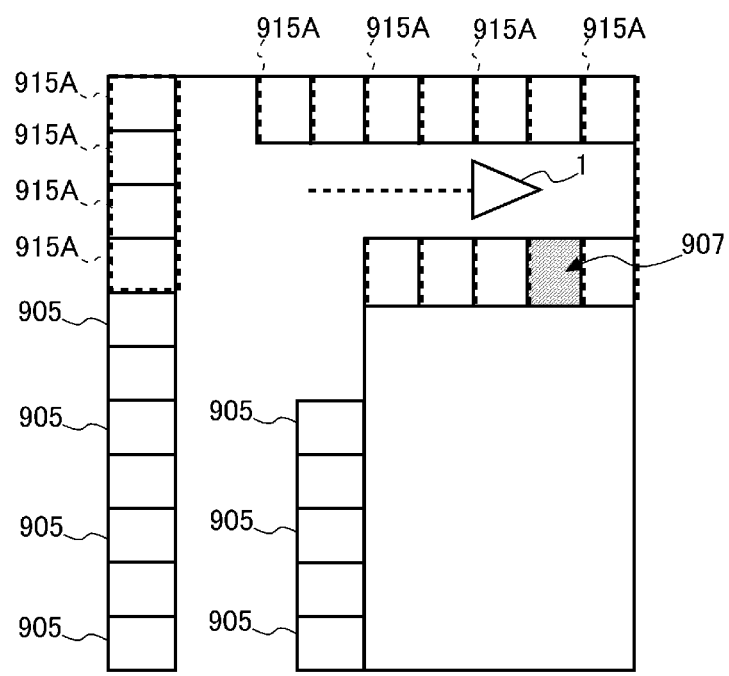
FIG. 22 is a view showing a matching result of matching processing.

The traveling locus 910 shown in FIG. 21 includes an effective locus 912 and a locus 911 other than the effective locus 912. The effective locus 912 is a locus from the point where the vehicle 1 starts turning right to the position of the vehicle 1 shown in FIG. 21. When the point cloud data 915A falling within a predetermined range around the effective locus 912 is used for matching, correct matching can be performed. FIG. 22 shows a matching result when the point cloud data 915A falling within the predetermined range around the effective locus 912 is used for the matching processing. The point cloud data 915A indicated by a broken line in FIG. 22 matches the parking frame for partitioning the parking position 905 indicated by a solid line.

Figure 23A:
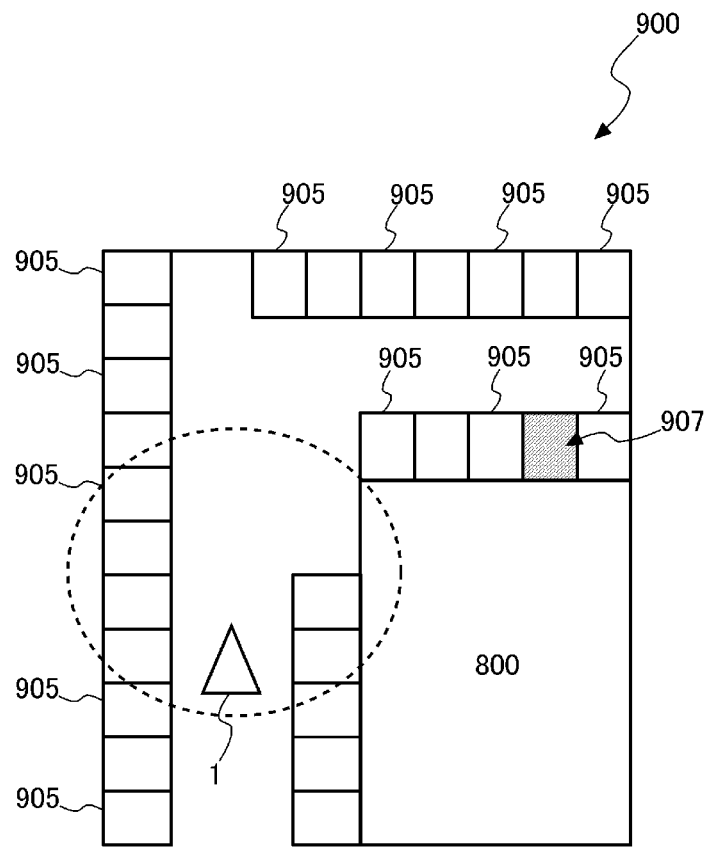
FIG. 23A is a view showing a current position of the vehicle.
Figure 23B:
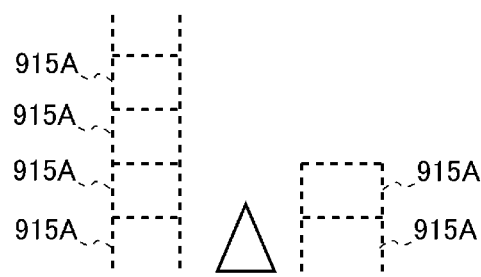
FIG. 23B is a view showing point cloud data detected at the current position.

FIG. 23A shows the current position of the vehicle 1, and FIG. 23B is a view showing the point cloud data 915A detected at the current position.

More specifically, FIG. 23B shows a state where the point cloud data 915A detected from the captured image captured by the camera 25 when the vehicle 1 is located at the position shown in FIG. 23A is converted into the coordinates of the parking lot and visualized. In FIGS. 23A and 23B, the vehicle 1 is also displayed for comparison. As shown in FIGS. 23A and 23B, the point cloud data 915A indicating the parking position 905 exists seamlessly on the left side of the vehicle 1, and the point cloud data 915A indicating the parking position 905 exists on only the front side of the right side of the vehicle 1.

Figure 24:
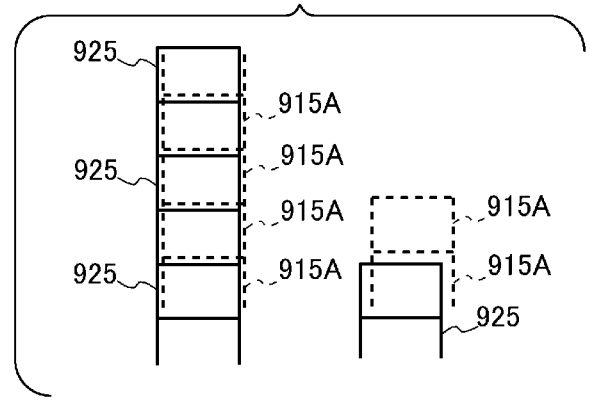
FIG. 24 is a view showing a matching result between point cloud data as parking lot data and point cloud data as local surrounding information.

FIG. 24 is a view showing a matching result between the point cloud data 925 registered as the parking lot data in the point cloud map 135 and the point cloud data 915A stored as the local surrounding information 121 in the RAM 120.

In FIG. 24, an error is included either the point cloud data 925 registered as the parking lot data in the point cloud map 135 or the local surrounding information 121, and the point cloud data 915A of the local surrounding information 121 existing on the right side of the vehicle 1 deviates from the point cloud data 925. When the instantaneous coincidence degree IC is calculated in such a state, the instantaneous coincidence degree IC becomes a low value due to the deviation of the point cloud data 915A on the right side of the vehicle 1.

When determining that the instantaneous coincidence degree IC is smaller than the threshold value, the automatic parking device 100 calculates the width of the parking frame using the point cloud data 925 registered as the parking lot data in the point cloud map 135, and calculates the overall coincidence degree IW by moving the point cloud data 915A of the local surrounding information 121 by an integral multiple of the calculated width of the parking frame.

Figure 25A:
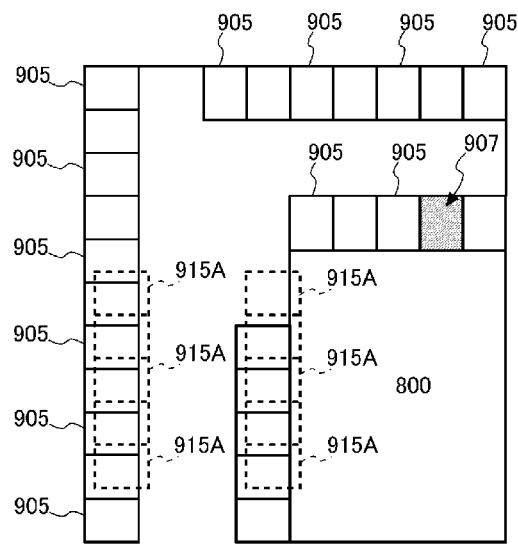
FIGS. 25A, 25B, and 25C are views showing a relation between the point cloud data as the local surrounding information and point cloud data as parking lot data when the point cloud data is moved by an integral multiple of a width of a parking frame.
Figure 25B:
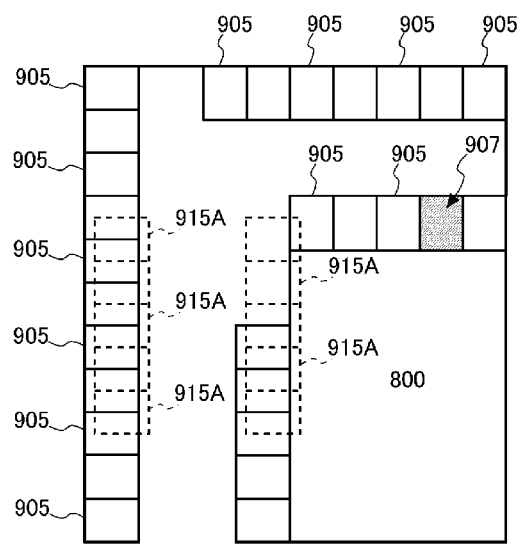
Figure 25C:
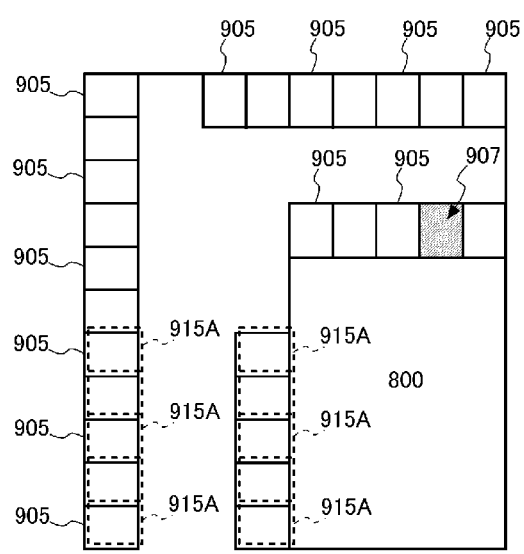

FIGS. 25A, 25B, and 25C are views showing a relation between the point cloud data 915A stored as the local surrounding information 121 in the RAM 120 and the point cloud data 925 when the point cloud data 915A is moved by the integral multiple of the width of the parking frame.

FIG. 25A is a view showing a positional relation between the point cloud data 915A and the point cloud data 925 before the point cloud data 915A is moved.

FIG. 25B is a view showing a positional relation between the point cloud data 915A and the point cloud data 925 when the point cloud data 915A is moved upward by +1 times of the width of the parking frame in the drawing view.

FIG. 25C is a view showing a positional relation between the point cloud data 915A and the point cloud data 925 when the point cloud data 915A is moved downward by −1 times of the width of the parking frame in the drawing view.

The point cloud data 915A shown in FIG. 25B is moved upward by one width of the parking frame in the drawing view, and the deviation between the point cloud data 915A and the point cloud data 925 is widened. Therefore, the overall coincidence degree IW in FIG. 25B is smaller than that before the point cloud data 915A shown in FIG. 25A is moved.

The point cloud data 915A shown in FIG. 25C is moved upward by one width of the parking frame in the drawing view, and the point cloud data 915A substantially coincides with the point cloud data 925. Therefore, the overall coincidence degree IW in FIG. 25C is larger than that before the point cloud data 915A shown in FIG. 25A is moved.

As described above, the moving amount of the point cloud data 915A is determined based on the overall coincidence degree IW, and the coordinate conversion formula corresponding to the determined moving amount is stored in the RAM 120. Thereby, the estimation accuracy of the self-position can be improved.

As described above, the automatic parking device 100 of the present embodiment includes the moving amount calculation unit 155A, the linear overhead-view image generation unit 155B, the distance-based turning angle generation unit 155C, the overhead-view image reconstruction unit 155D, and the non-volatile storage unit 130.

The moving amount calculation unit 155A calculates the moving distance of the vehicle 1 using the sensor data of the vehicle speed sensor 41.

The linear overhead-view image generation unit 155B generates the overhead-view image 200 obtained by conversion of the viewpoint of the captured image into the overhead viewpoint using the surrounding image of the vehicle captured by the camera 25, and generates the linear overhead-view image 131 obtained by linear shape conversion of the generated overhead-view image.

The distance-based turning angle generation unit 155C calculates the distance-based turning angle information 133 indicating the turning angle for each predetermined moving distance of the vehicle 1 using the turning amount of the vehicle 1 indicated by the sensor data of the steering angle sensor 43 and the moving distance calculated by the moving amount calculation unit 155A.

The non-volatile storage unit 130 stores the linear overhead-view image 131 and the distance-based turning angle information 133.

The overhead-view image reconstruction unit 155D reconstructs the overhead-view image 200 using the linear overhead-view image 131 and the distance-based turning angle information 133.

As described above, the automatic parking device 100 of the present embodiment causes the non-volatile storage unit 130 to store the linear overhead-view image 131 obtained by the linear shape conversion of the overhead-view image and the distance-based turning angle information 133 indicating the turning angle of the vehicle 1 for each moving distance, and generates the overhead-view image 200 based on the linear overhead-view image 131 and the distance-based turning angle information 133 during the generation of the overhead-view image 200. Therefore, the data quantity of the overhead-view image 200 can be reduced.

Since the data quantity of the linear overhead-view image 131 is smaller than that of the overhead-view image 200, the data quantity to be stored in the non-volatile storage unit 130 can be significantly reduced compared with the case where the overhead-view image 200 is stored in the non-volatile storage unit 130.

Further, when the linear overhead-view image 131 is stored in the non-volatile storage unit 130, the parking lot having the hierarchical structure such as a three-dimensional parking lot can also be represented by the two-dimensional image, and when the linear overhead-view image 131 is used, the overhead-view image 200 can be generated even in the three-dimensional parking lot.

In the case where the sensor data contains an error, when the vehicle goes around once and returns to the same location, the overhead-view image 200 to be naturally placed on the same location may overlap over another location due to the error, but even when the sensor data contains the error, the overhead-view image 200 does not overlap erroneously, and staining of the overhead-view image 200 can be reduced.

Figure 26:
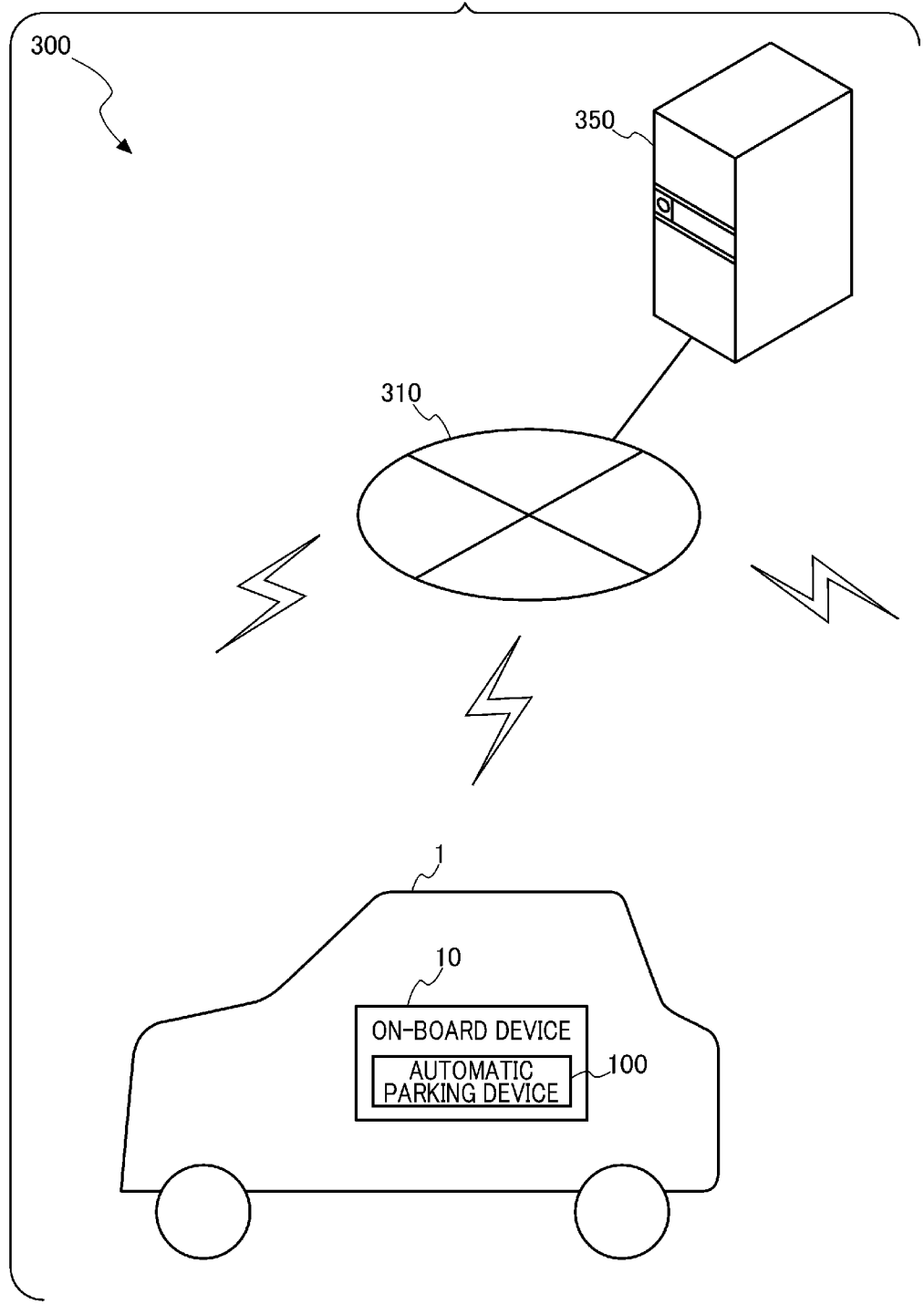
FIG. 26 is a system configuration diagram of an overhead-view image generation system.

FIG. 26 is a system configuration diagram of an overhead-view image generation system 300.

The overhead-view image generation system 300 includes a configuration in which the on-board device 10 mounted on the vehicle 1 is connected to a server device 350 via a network 310.

The on-board device 10 includes the automatic parking device 100. When the operation mode shifts to the map storage mode 220, the automatic parking device 100 generates the parking lot data by the procedure shown in the flowchart of FIG. 12, and uploads the generated parking lot data and identification information of the automatic parking device 100 to the server device 350 via the communication device 60.

The server device 350 includes a storage device that stores the point cloud map 135 in which the parking lot data received from the automatic parking device 100 is registered. The server device 350 causes the storage device to store the point cloud map 135 in correlation with the identification information of the automatic parking device 100.

When receiving the parking lot data from the automatic parking device 100, the server device 350 searches for the point cloud map 135 corresponding to the received identification information, and registers the parking lot data in the searched point cloud map 135.

When the operation mode shifts to the position estimation mode 230, the automatic parking device 100 transmits the latitude and longitude acquired from the navigation device 30 and the identification information of the automatic parking device 100 to the server device 350 via the communication device 60.

The server device 350 refers to the point cloud map 135 corresponding to the received identification information, and acquires parking lot data of latitude and longitude substantially coinciding with the received latitude and longitude. The server device 350 allows the corresponding automatic parking device 100 to download the acquired parking lot data.

When the parking lot data is received from the server device 350, the automatic parking device 100 estimates the position of the vehicle 1 according to the procedure shown in FIG. 13, and executes automatic parking.

The above-described embodiment merely illustrates one aspect of the present invention, and can be arbitrarily modified and applied without departing from the gist of the present invention.

For example, the above-described embodiment can be modified as follows.

(1) The storage device, which stores the sensor error database 137 and the environment database 139, may be an auxiliary storage device such as a hard disk drive, or may be stored in a server device external to the on-board device 10.

(2) The automatic parking device 100 does not have to receive the sensing result from the vehicle speed sensor 41 and the steering angle sensor 43. In this case, the automatic parking device 100 estimates the moving of the vehicle 1 using the captured image of the camera 25. The automatic parking device 100 calculates the positional relation between the subject and the camera 25 using the internal parameters and the external parameters stored in the ROM 110. Then, the moving amount and the moving direction of the vehicle 1 are estimated by tracking of the subject in the plurality of captured images.

(2) The point cloud map 135 and the local surrounding information 121 may be stored as three-dimensional information in the non-volatile storage unit 130. The three-dimensional point cloud information may be compared with other point clouds in a two-dimension by projecting on a two-dimensional plane, or in a three-dimension. In this case, the automatic parking device 100 can use the moving amount of the vehicle 1 calculated based on the sensor data input from the vehicle speed sensor 41 and the steering angle sensor 43 and the plurality of captured images input from the camera 25, and thus obtain a three-dimensional point cloud using a known motion stereo technique and information obtained by correcting a motion estimation portion with an internal sensor or the positioning sensor.

(3) The process may proceed to step T3565 when the automatic parking device 100 continuously performs the negative determination several times instead of performing the negative determination only once in step T3564 of FIG. 16.

(5) Instead of the determination in step T3564 of FIG. 16, the automatic parking device 100 may determine whether the ratio of points determined to be outliers in the point cloud data included in the local surrounding information 121 is larger than a predetermined threshold value. When the automatic parking device 100 determines that the ratio of points determined to be outliers is larger than the threshold value, the process proceeds to step T3565, and the automatic parking device 100 determines that the ratio of points determined to be outliers is equal to or smaller than the threshold value, the process proceeds to step T3570. Further, when the automatic parking device 100 determines in addition to the determination in step T3564 of FIG. 16 that ratio of points determined to be outliers is larger than the threshold value, the process may proceed to step ST3565.

(6) The automatic parking device 100 may perform the processing of step T3565 and step T3567 of FIG. 16.

Further, the automatic parking device 100 may cause the RAM 120 or the non-volatile storage unit 130 to store the processing results.

(7) The automatic parking device 100 may receive an operation command from the user not only from the input device 70 provided inside the vehicle 1 but also from the communication device 60. For example, when a mobile terminal owned by the user communicates with the communication device 60 and the user operates the mobile terminal, the automatic parking device 100 may perform the same operation as when the automatic parking button 73 is pressed. In this case, the automatic parking device 100 can perform automatic parking not only when the user is inside the vehicle 1 but also after the user gets off the vehicle.

(8) The automatic parking device 100 may cause the vehicle 1 to be parked not only at the parking position registered in the point cloud map 135 but also at a position designated by the user. The user designates the parking position when the automatic parking device 100 causes the display device 80 to display candidates of the parking position and the user selects any one of the candidates using the input device 70, for example.

(9) The automatic parking device 100 may receive the point cloud map 135 from the outside via the communication device 60, or may transmit the created point cloud map 135 to the outside via the communication device 60. In addition, the automatic parking device 100 may transmit and receive the point cloud map 135 to/from another automatic parking device 100 mounted on another vehicle, or to/from a device managed by an organization that manages the parking lot.

(10) The on-board device 10 may include a mobile terminal instead of the navigation device 30, and may record identification information of a base station, with which the mobile terminal communicates, instead of the latitude and longitude. When the communication is performed with the same base station, there is a high possibility that the parking lot is the same because a communication range of the base station is limited to about several hundred meters.

(11) The periodic feature included in the parking lot data is not limited to the parking frame. For example, a plurality of straight lines forming a pedestrian crossing, which is one of the road surface paints, is also the periodic feature. Further, when the parking lot data includes information on obstacles such as walls acquired by a laser radar, regularly arranged pillars are also the periodic feature.

(12) In the above-described embodiment, the landmark does not include other vehicles and humans that are being moving objects, but the landmark may include the moving objects. In such a case, the landmark of the moving object and the landmark other than the moving object may be stored so as to be identifiable from each other.

(13) The automatic parking device 100 may identify the detected landmark and record the identification result of each landmark together with the point cloud map 135 in the map storage mode 220. For the identification of the landmark, the shape information and color information of the landmark obtained from the captured image and the three-dimensional shape information of the landmark obtained by the known motion stereo technique are used. The landmark is identified as parking frames, road surface paints other than the parking frames, curbs, guardrails, and walls. Further, the automatic parking device 100 may include other vehicles and humans being moving objects in the landmark, and record the identification result in the point cloud map 135 together with the moving objects in the same manner as the other landmarks. In this case, the other vehicles and the humans may be collectively identified and recorded as a "moving object", or the other vehicles and the humans may be individually identified and recorded.

Further, the processing units of the flowcharts shown in FIGS. 9 to 17 are divided according to the main processing contents in order to facilitate understanding of the processing executed by the automatic parking device 100. There is no limit to be set on the present invention by the way of how the processing units are divided and the names thereof.

The processing of the automatic parking device 100 can be divided into more processing units according to the processing contents, or can be divided such that one processing unit includes more processing. In addition, the processing order of each of the flowcharts is not limited to the examples shown in the drawings.

Further, when the information processing method of the present invention is realized by a computer, the program to be executed by the computer may be configured as a form of recording medium or a form of transmission medium that transmits the program. A magnetic recording medium, an optical recording medium, or a semiconductor memory device can be used as the recording medium. Specifically, examples of the recording medium may include a flexible disk, an HDD (Hard Disk Drive), a CD-ROM (Compact Disk Read Only memory), a DVD, a Blu-ray (registered trademark) Disc, and a magneto-optical disk. Further, examples of the recording medium may include a portable or fixed recording media such as a flash memory or a card recording medium. In addition, the recording medium may be a non-volatile storage device such as RAM, ROM, or an HDD, which is an internal storage device included in the display device.

REFERENCE SIGNS LIST

1 vehicle
5 communication bus
10 on-board device
20 external sensor group
21 radar
23 sonar
25 camera
30 navigation device
31 GNSS receiver
33 storage unit
35 road map
40 vehicle sensor group
41 vehicle speed sensor
43 steering angle sensor
50 vehicle control device
51 steering device
53 driving device
55 brake device
60 communication device
70 input device
71 response button
73 automatic parking button
100 automatic parking device
101 interface
110 ROM
120 RAM
121 local surrounding information
123 outlier list
130 non-volatile storage unit
131 linear overhead-view image
133 distance-based turning angle information
135 point cloud map 137 sensor error database
139 environment database
150 processor
151 data acquisition unit
152 landmark positioning unit
153 point cloud data verification unit
154 parking lot data registration unit
155 overhead-view image generation unit
155A moving amount calculation unit
155B linear overhead-view image generation unit
155C distance-based turning angle generation unit
155D overhead-view image reconstruction unit
156 position estimation unit
157 parking route generation unit
158 control information generation unit
160 mode switching unit
200 overhead-view image
201 region
210 normal traveling mode
220 map storage mode
230 position estimation mode
240 automatic parking mode
250 give-up mode
800 building
801 left side surface
803 upper surface
900 parking lot
901 entrance/exit gate
903, 903A, 903B passageway
905 parking region
907 parking position
910 traveling locus
912 effective locus
915A, 915B point cloud data
925 point cloud data
1351 parking position
1352 landmark
1353 traveling route

What is claimed is:

1. An overhead-view image generation device comprising:
   a processor,
   wherein the processor includes
   a data acquisition unit configured to acquire sensor data of a sensor mounted on a vehicle;
   a moving amount calculation unit configured to calculate a moving amount of the vehicle using the sensor data acquired by the data acquisition unit;
   a linear overhead-view image generation unit configured to use a captured image of a surrounding of the vehicle included in the sensor data acquired by the data acquisition unit to generate an overhead-view image, the overhead-view image being obtained by conversion of a viewpoint of the captured image into an overhead viewpoint, and generate a linear overhead-view image by joining the converted images together in a time-series way along a traveling locus of the vehicle, the linear overhead-view image being obtained by conversion of a shape of the generated overhead-view image into a linear shape by considering only a moving distance of the vehicle calculated by the moving amount calculation unit without considering information on a turning amount indicated by the sensor data of a steering angle sensor;
   a moving amount-based turning amount calculation unit configured to calculate the turning amount of the vehicle based on a predetermined moving amount of the vehicle, using the sensor data acquired by the data acquisition unit and indicating a turning amount of the vehicle and the moving amount calculated by the moving amount calculation unit;
   a mode switching unit configured to shift an operation mode of the vehicle to a map storage mode and start recording the sensor data when it is determined that the sensor data is not recorded near a point where the vehicle is currently traveling;
   a storage unit configured to, in the map storage mode, store the linear overhead-view image and a distance-based turning angle information separately in a memory wherein the linear overhead-view image is generated by the linear overhead-view image generation unit by a reflection of information on the moving amount of the vehicle, and the distance-based turning angle information is registered in a table in which the moving amount and the turning amount are registered in correlation with each other in a coordinate system in which a position of the vehicle at a start time of recording the sensor data is an origin, a traveling direction of the vehicle at the start time of recording is a Y-axis, and a right direction of the vehicle at the start time of the recording is an X-axis; and
   an overhead-view image reconstruction unit configured to reconstruct the overhead-view image including turning angle information by using the distance-based turning angle information.

2. The overhead-view image generation device according to claim 1, wherein
   the linear overhead-view image generation unit generates, using the captured image and a parameter indicating a mounting position in the vehicle of a camera that captures the captured image, the overhead-view image obtained by the conversion of the viewpoint of the captured image into the overhead viewpoint, and
   the linear overhead-view image generation unit determines, based on the predetermined moving amount of the vehicle calculated by the moving amount calculation unit, coordinates of a linear image correlated with coordinates of the overhead-view image, and projects a pixel value of the correlated coordinates of the overhead-view image on the determined coordinates to generate the linear overhead-view image.

3. The overhead-view image generation device according to claim 1, wherein
   the storage unit divides the linear overhead-view image for each preset data quantity or distance and stores the divided linear overhead-view images in the memory.

4. The overhead-view image generation device according to claim 3, wherein
   the overhead-view image reconstruction unit reads, from the memory, a part of the linear overhead-view image and the information indicating the turning amount based on the predetermined moving amount, and reconstructs the overhead-view image based on the read linear overhead-view image and the turning amount based on the predetermined moving amount.

5. An overhead-view image generation system comprising:
   an overhead-view image generation device according to claim 1; and
   a server device,
   wherein the overhead-view image generation device including: includes
   a communication unit including a transmitter and a receiver configured to transmit the linear overhead-view image and the distance-based turning angle information to the server device, and the server device includes a server device side memory configured to receive and store the linear overhead-view image and the distance-based turning angle information from the overhead-view image generation device.

6. The overhead-view image generation system according to claim 5, wherein the processor of the overhead-view image generation device includes an overhead-view image reconstruction unit configured to reconstruct the overhead-view image based on the linear overhead-view image and the distance-based turning angle information based on the moving amount which are received by the server device from the communication unit.

7. An automatic parking device comprising the overhead-view image generation device according to claim 1, the storage unit being configured to store point cloud data indicating coordinates in a first coordinate system of a point cloud representing a part of an object existing around the vehicle in correlation with positioning data indicating a latitude and longitude, the automatic parking device including:

a landmark positioning unit configured to generate, based on the sensor data acquired by the data acquisition unit and the moving amount calculated by the moving amount calculation unit, local surrounding information including multiple coordinates in a second coordinate system of a point cloud representing a position of the vehicle and a part of the object in the second coordinate system;

a position estimation unit configured to estimate, based on the point cloud data and the local surrounding information, a relation between the first coordinate system and the second coordinate system, and estimate a position of the vehicle in the first coordinate system;

a display control unit configured to cause a display device to display the position of the vehicle, which is estimated by the position estimation unit, to be superimposed on the overhead-view image generated by the overhead-view image generation device; and an automatic parking unit configured to drive the vehicle based on the point cloud data and the position of the vehicle estimated by the position estimation unit, and move the vehicle to a preset parking position in the first coordinate system.

* * * * *